United States Patent
Sun et al.

(10) Patent No.: US 10,164,695 B2
(45) Date of Patent: Dec. 25, 2018

(54) TONE BLOCK AND SPATIAL STREAM ALLOCATION

(71) Applicant: Marvell World Trade Ltd., St. Michael (BB)

(72) Inventors: Yakun Sun, Sunnyvale, CA (US); Hongyuan Zhang, Fremont, CA (US); Liwen Chu, San Ramon, CA (US); Lei Wang, San Diego, CA (US); Hui-Ling Lou, Sunnyvale, CA (US); Jinjing Jiang, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 140 days.

(21) Appl. No.: 15/173,152

(22) Filed: Jun. 3, 2016

(65) Prior Publication Data

US 2016/0285600 A1 Sep. 29, 2016

Related U.S. Application Data

(63) Continuation-in-part of application No. 14/707,898, filed on May 8, 2015, now Pat. No. 9,596,060.

(Continued)

(51) Int. Cl.
*H04B 7/04* (2017.01)
*H04B 7/0456* (2017.01)
(Continued)

(52) U.S. Cl.
CPC ......... *H04B 7/0456* (2013.01); *H04B 7/0452* (2013.01); *H04L 5/0023* (2013.01); *H04L 5/0039* (2013.01); *H04L 5/0091* (2013.01)

(58) Field of Classification Search
CPC ... H04B 7/0452; H04B 7/0456; H04L 5/0007; H04L 5/0023

See application file for complete search history.

(56) References Cited

U.S. PATENT DOCUMENTS

| 7,599,332 B2 | 10/2009 | Zelst et al. |
| 7,742,390 B2 | 6/2010 | Mujtaba |

(Continued)

FOREIGN PATENT DOCUMENTS

| WO | WO-2012-051319 | 4/2012 |
| WO | WO-2015/077223 A1 | 5/2015 |

OTHER PUBLICATIONS

International Preliminary Report on Patentability in International Patent Application No. PCT/US2016/035827, dated Dec. 14, 2017.

(Continued)

*Primary Examiner* — Min Jung

(57) ABSTRACT

A method is described. A block allocation that indicates a plurality of contiguous tone blocks of a wireless local area network communication channel is selected for a multi-user, multiple input multiple output (MU-MIMO) orthogonal frequency division multiple access (OFDMA) data unit. A contiguous tone block corresponds to a respective device set having at least one communication device. Respective spatial stream allocations are selected, for at least some of the blocks, that indicate a number of spatial streams for the corresponding block of the data unit. The number of streams of a block is equal to a number of communication devices of the device set that corresponds to the block. A first field is encoded and transmitted to indicate the selected block allocation and the selected spatial stream allocations. A second field is encoded and transmitted to indicate a respective device identifier for each communication device of the respective device sets.

14 Claims, 12 Drawing Sheets

Related U.S. Application Data

(60) Provisional application No. 61/990,925, filed on May 9, 2014, provisional application No. 62/030,516, filed on Jul. 29, 2014, provisional application No. 62/113,744, filed on Feb. 9, 2015, provisional application No. 62/151,341, filed on Apr. 22, 2015, provisional application No. 62/171,534, filed on Jun. 5, 2015, provisional application No. 62/183,849, filed on Jun. 24, 2015, provisional application No. 62/246,311, filed on Oct. 26, 2015.

(51) Int. Cl.
*H04B 7/0452* (2017.01)
*H04L 5/00* (2006.01)

(56) References Cited

U.S. PATENT DOCUMENTS

| | | |
|---|---|---|
| 8,144,647 B2 | 3/2012 | Nabar et al. |
| 8,149,811 B2 | 4/2012 | Nabar et al. |
| 8,270,909 B2 | 9/2012 | Zhang et al. |
| 8,289,869 B2 | 10/2012 | Sawai |
| 8,363,578 B1 | 1/2013 | Ramamurthy et al. |
| 8,472,383 B1 | 6/2013 | Banerjea et al. |
| 8,599,803 B1 | 12/2013 | Zhang et al. |
| 8,619,907 B2 | 12/2013 | Mujtaba et al. |
| 8,660,497 B1 | 2/2014 | Zhang et al. |
| 8,670,399 B2 | 3/2014 | Liu et al. |
| 8,737,405 B2 | 5/2014 | Liu et al. |
| 8,787,338 B2 | 7/2014 | Liu et al. |
| 8,787,385 B2 | 7/2014 | Liu et al. |
| 8,811,203 B1 | 8/2014 | Liu et al. |
| 8,886,755 B1 | 11/2014 | Liu et al. |
| 8,923,118 B1 | 12/2014 | Liu et al. |
| 8,971,350 B1 | 3/2015 | Liu |
| 9,215,055 B2 | 12/2015 | Chu et al. |
| 2007/0217540 A1* | 9/2007 | Onggosanusi ....... H04B 7/0417 375/267 |
| 2008/0075058 A1 | 3/2008 | Mundarath et al. |
| 2008/0080449 A1 | 4/2008 | Huang et al. |
| 2008/0117867 A1 | 5/2008 | Yin et al. |
| 2008/0192644 A1 | 8/2008 | Utsonomiya et al. |
| 2009/0196163 A1 | 8/2009 | Du |
| 2010/0046358 A1 | 2/2010 | van Nee |
| 2010/0250159 A1 | 9/2010 | Hall |
| 2010/0260159 A1 | 10/2010 | Zhang et al. |
| 2010/0309834 A1 | 12/2010 | Fischer et al. |
| 2011/0002219 A1 | 1/2011 | Kim et al. |
| 2011/0038332 A1 | 2/2011 | Liu et al. |
| 2011/0096796 A1 | 4/2011 | Zhang et al. |
| 2011/0096797 A1 | 4/2011 | Zhang et al. |
| 2011/0110339 A1 | 5/2011 | Jeong et al. |
| 2011/0128929 A1 | 6/2011 | Liu et al. |
| 2011/0128947 A1 | 6/2011 | Liu et al. |
| 2011/0194475 A1 | 8/2011 | Kim et al. |
| 2011/0310827 A1 | 12/2011 | Srinivasa et al. |
| 2012/0300724 A1* | 11/2012 | Liu .................... H04W 72/1289 370/329 |
| 2012/0315938 A1 | 12/2012 | Van Nee et al. |
| 2013/0229996 A1 | 9/2013 | Wang et al. |
| 2013/0259017 A1 | 10/2013 | Zhang et al. |
| 2013/0286959 A1 | 10/2013 | Lou et al. |
| 2013/0308524 A1 | 11/2013 | Tavildar et al. |
| 2014/0226739 A1* | 8/2014 | Onggosanusi ....... H04B 7/0456 375/267 |
| 2015/0063255 A1 | 3/2015 | Tandra et al. |
| 2015/0117227 A1 | 4/2015 | Zhang et al. |
| 2015/0131517 A1 | 5/2015 | Chu et al. |
| 2015/0146653 A1 | 5/2015 | Zhang et al. |
| 2015/0146657 A1 | 5/2015 | Tsai et al. |
| 2015/0146807 A1 | 5/2015 | Zhang et al. |
| 2016/0204912 A1 | 7/2016 | Sun et al. |
| 2016/0227572 A1* | 8/2016 | Li ........................ H04L 5/0094 |

OTHER PUBLICATIONS

Office Action in U.S. Appl. No. 15/337,530, dated Nov. 22, 2017 (42 pages).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks-Specific requirements, Part 11: Wireless LAN Medium Access

(56) References Cited

OTHER PUBLICATIONS

Control (MAC) and Physical Layer (PHY) specifications: Further Higher Data Rate Extension in the 2.4 GHz Band, "*The Institute of Electrical and Electronics Engineers, Inc.*, pp. 1-69 (Apr. 2003).
IEEE P802.11n$^{TM}$ D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).
IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).
IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).
IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).
IEEE Std 802.16$^{I\ M}$-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).
Cariou et al., "Multi-channel Transmissions," Doc. No. IEEE 802.11-09/1022r0, *The Institute of Electrical and Electronics Engineers, Inc.*, pp. 1-13 (Sep. 2009).
Chen, "Home Network Basis: Transmission Environments and Wired/Wireless Protocols," Prentice Hall, pp. 1-26 (Jul. 2003).
Chun et al., "Legacy Support on HEW frame structure," doc: IEEE 11-13/1057r0, *The Institute of Electrical and Electronics Engineers, Inc.*, pp. 1-8 (Sep. 2013).
Hiertz et al., "The IEEE 802.11 Universe," *IEEE Communications Magazine*, pp. 62-70, (Jan. 2010).
Liu et al., "VHT BSS Channel Selection," *Institute of Electrical and Electronics Engineers, Inc.*, doc. No. IEEE 802.11-11/1433r0, pp. 1-10 (Nov. 2011).
Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Noh et al., "Channel Selection and Management for 11ac," Doc. No. IEEE 802.11-10/0593r1, *The Institute of Electrical and Electronics Engineers, Inc.*, pp. 1-21 (May 20, 2010).
Park, "IEEE 802.11ac: Dynamic Bandwidth Channel Access," 2011 IEEE Int'l Conf. on Communications (ICC), pp. 1-5 (Jun. 2011).
Pedersen et al., "Carrier Aggregation for LTE-Advanced: Functionality and Performance Aspects," IEEE Communications Magazine, vol. 49, No. 6, pp. 89-95, (Jun. 1, 2011).
Perahia et al., "Gigabit Wireless LANs: an overview of IEEE 802.11ac and 80211ad," ACM Sigmobile Mobile Computing and Communications Review, vo. 15, No. 3, pp. 23-33 (Jul. 2011).
Redieteab et al., "Cross-Layer Multichannel Aggregation for Future WLAN Systems," 2010 IEEE Int'l Conf. on Communication Systems (ICCS), pp. 740-756 (Nov. 2010).
Shahrnaz et al. "OFDMA Numerology and Structure," IEEE 802.11-15/0330r1 (Mar. 9 2015—38 pages.
Seok et al., "HEW PPDU Format for Supporting MIMO-OFDMA," IEEE 802.11-14/1210r0, 16 pages, (Sep. 14, 2014).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).
Van Nee et al. "The 802.11n MIMO-OFDM Standard for Wireless LAN and Beyond," Wireless Personal Communications, vol. 37, pp. 445-453 (Jun. 2006).
Wannstrom, "Carrier Aggregation explained," pp. 1-6 (May 2012).

(56) References Cited

OTHER PUBLICATIONS

Yuan et al., "Carrier Aggregation for LTE-Advanced Mobile Communication Systems," IEEE Communications Magazine, pp. 88-93 (Feb. 2010).
U.S. Appl. No. 12/730,651, Zhang, et al, "OFDMA with Block Tone Assignment for WLAN," filed Mar. 24, 2010.
U.S. Appl. No. 14/707,898, Sun et al., "Tone Block Allocation for Orthogonal Division Multiple Access Data Unit," filed May 8, 2015.
International Search Report and Written Opinion for International Application No. PCT/US2016/035827, dated Nov. 2, 2016 (14 pages).
Kwon et al., "SIG Field Design Principle for 11ax," Institute for Electrical and Electronics Engineers, draft, 802.11-15/0344r2, 18 pages (Mar. 9, 2015).
U.S. Appl. No. 15/337,530, Sun et al., "Tone Block Allocation for Orthogonal Frequency Division Multiple Access Data Unit," filed Oct. 28, 2016.
Notice of Allowance in U.S. Appl. No. 15/337,530, dated May 17, 2018 (15 pages).
Notice of Allowance in U.S. Appl. No. 15/337,530, dated Sep. 17, 2018 (20 pages).

\* cited by examiner

| B0-B3 | B4B5 (left half of 242 tones) | B6B7 (right half of 242 tones) | Center 26-tone block |
|---|---|---|---|
| 0000 | single user, use block codebook | single user, use block codebook | Scheduled |
| 0001 | single user, use block codebook | multi-user, use MU codebook | Scheduled |
| 0010 | single user, use block codebook | multi-user, use MU codebook plus offset | Scheduled |
| 0011 | multi-user, use MU codebook | multi-user, use MU codebook | Not scheduled |
| 0100 | multi-user, use MU codebook | single user, use block codebook | Scheduled |
| 0101 | multi-user, use MU codebook | multi-user, use MU codebook | Scheduled |
| 0110 | multi-user, use MU codebook | multi-user, use MU codebook plus offset | Scheduled |
| 0111 | multi-user, use MU codebook | multi-user, use MU codebook plus offset | Not scheduled |
| 1000 | multi-user, use MU codebook plus offset | single user, use block codebook | Scheduled |
| 1001 | multi-user, use MU codebook plus offset | multi-user, use MU codebook | Scheduled |
| 1010 | multi-user, use MU codebook plus offset | multi-user, use MU codebook plus offset | Scheduled |
| 1011 | multi-user, use MU codebook plus offset | multi-user, use MU codebook | Not scheduled |
| 1100 | Special cases per remainder codebook | Special cases per remainder codebook | |
| 1101 | RU >= 242-tone per wide codebook | multi-user, use MU codebook | N/A |
| 1110 | RU >= 242-tone per wide codebook | multi-user, use MU codebook plus offset | N/A |
| 1111 | multi-user, use MU codebook plus offset | multi-user, use MU codebook plus offset | Not scheduled |

*FIG. 10B*

| B0-B3 | B4B5 (left half of 242 tones) | B6B7 (right half of 242 tones) | Center 26-tone block |
|---|---|---|---|
| 0000 | single user, use block codebook | single user, use block codebook | Scheduled |
| 0001 | single user, use block codebook | multi-user, use MU codebook | Scheduled |
| 0010 | single user, use block codebook | multi-user, use MU codebook plus offset | Scheduled |
| 0011 | single user, use block codebook | single user, use block codebook | Not scheduled |
| 0100 | multi-user, use MU codebook | single user, use block codebook | Scheduled |
| 0101 | multi-user, use MU codebook | multi-user, use MU codebook | Scheduled |
| 0110 | multi-user, use MU codebook | multi-user, use MU codebook plus offset | Scheduled |
| 0111 | multi-user, use MU codebook plus offset | single user, use block codebook | Not scheduled |
| 1000 | multi-user, use MU codebook plus offset | single user, use block codebook | Scheduled |
| 1001 | multi-user, use MU codebook plus offset | multi-user, use MU codebook | Scheduled |
| 1010 | multi-user, use MU codebook plus offset | multi-user, use MU codebook plus offset | Scheduled |
| 1011 | single user, use block codebook | multi-user, use MU codebook | Not scheduled |
| 1100 | Special cases per remainder codebook | Special cases per remainder codebook | |
| 1101 | RU >= 242-tone per wide codebook | multi-user, use MU codebook | N/A |
| 1110 | RU >= 242-tone per wide codebook | multi-user, use MU codebook plus offset | N/A |
| 1111 | multi-user, use MU codebook | multi-user, use MU codebook | Not scheduled |

*FIG. 10C*

TONE BLOCK AND SPATIAL STREAM ALLOCATION

CROSS-REFERENCES TO RELATED APPLICATIONS

This application is a continuation-in-part of U.S. application Ser. No. 14/707,898, entitled "Tone Block Allocation for Orthogonal Frequency Division Multiple Access Data Unit" and filed on May 8, 2015, which claims the benefit of U.S. Provisional Patent Application No. 61/990,925, entitled "OFDMA Contiguous Resource Allocation Signaling for WiFi" and filed on May 9, 2014, U.S. Provisional Patent Application No. 62/030,516, entitled "OFDMA Contiguous Resource Allocation Signaling for WiFi" and filed on Jul. 29, 2014, U.S. Provisional Patent Application No. 62/113,744, entitled "OFDMA Contiguous Resource Allocation Signaling for WiFi" and filed on Feb. 9, 2015, and U.S. Provisional Patent Application No. 62/151,341, entitled "OFDMA Contiguous Resource Allocation Signaling for WiFi" and filed on Apr. 22, 2015, the disclosures of each of which are incorporated herein by reference in their entireties. The present application also claims the benefit of U.S. Provisional Application No. 62/171,534, entitled "OFDMA Contiguous Resource Allocation Signaling for WiFi" and filed on Jun. 5, 2015, U.S. Provisional Application No. 62/183,849, entitled "OFDMA Contiguous Resource Allocation Signaling for WiFi" and filed on Jun. 24, 2015, and U.S. Provisional Application No. 62/246,311, entitled "OFDMA Contiguous Resource Allocation Signaling for WiFi" and filed on Oct. 26, 2015, the disclosures of each of which are incorporated herein by reference in their entireties.

FIELD OF THE DISCLOSURE

The present disclosure relates generally to communication networks and, more particularly, to wireless local area networks that utilize orthogonal frequency division multiple access.

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method includes selecting a block allocation that indicates a plurality of contiguous tone blocks of a wireless local area network (WLAN) communication channel for a multi-user, multiple input multiple output (MU-MIMO) orthogonal frequency division multiple access (OFDMA) data unit. Each of the plurality of contiguous tone blocks corresponds to a respective device set having at least one communication device. The method includes selecting, for at least some of the plurality of contiguous tone blocks, respective spatial stream allocations that indicate a number of spatial streams for the corresponding contiguous tone block of the MU-MIMO OFDMA data unit. The number of spatial streams of a contiguous tone block is equal to a number of communication devices of the device set that corresponds to the contiguous tone block. The method also includes encoding a first field to indicate the selected block allocation and the selected spatial stream allocations. The method includes encoding one or more second fields to indicate a respective device identifier for each communication device of the respective device sets. The method also includes transmitting the first field and the one or more second fields to the communication devices of the respective device sets.

In another embodiment, an apparatus includes a network interface device having one or more integrated circuits. The one or more integrated circuits are configured to select a block allocation that indicates a plurality of contiguous tone blocks of a wireless local area network (WLAN) communication channel for a multi-user, multiple input multiple output (MU-MIMO) orthogonal frequency division multiple access (OFDMA) data unit. Each of the plurality of contiguous tone blocks corresponds to a respective device set having at least one second communication device. The one or more integrated circuits are configured to select, for at least some of the plurality of contiguous tone blocks, respective spatial stream allocations that indicate a number of spatial streams for the corresponding contiguous tone block of the MU-MIMO OFDMA data unit. The number of spatial streams of a contiguous tone block is equal to a number of communication devices of the device set that corresponds to the contiguous tone block. The one or more integrated circuits are configured to encode a first field to indicate the selected block allocation and the selected spatial stream allocations. The one or more integrated circuits are configured to encode one or more second fields to indicate a respective device identifier for each communication device of the respective device sets. The one or more integrated circuits are configured to transmit the first field and the one or more second fields to the communication devices of the respective device sets.

In yet another embodiment, a method includes receiving an orthogonal frequency division multiple orthogonal frequency division multiplex (OFDM) data unit via a wireless local area network (WLAN) communication channel. The method also includes decoding a non-legacy signal field of the OFDM data unit to determine i) a block allocation that indicates a plurality of contiguous tone blocks of the WLAN communication channel, and ii) respective spatial stream allocations that indicate a number of spatial streams for at least some of the plurality of contiguous tone blocks. Each of the plurality of contiguous tone blocks corresponds to a respective device set having at least one communication device and the number of spatial streams of a contiguous tone block is equal to a number of communication devices of the device set that corresponds to the contiguous tone block. The method includes determining an assigned contiguous tone block and spatial stream based on the block allocation and the spatial stream allocations. The method includes decoding a data portion of a multi-user, multiple input multiple output (MU-MIMO) orthogonal frequency division multiple access (OFDMA) data unit using the assigned contiguous tone block and spatial stream.

In another embodiment, an apparatus includes a network interface device having one or more integrated circuits. The one or more integrated circuits are configured to receive an orthogonal frequency division multiple orthogonal frequency division multiplex (OFDM) data unit via a wireless local area network (WLAN) communication channel. The one or more integrated circuits are configured to decode a non-legacy signal field of the OFDM data unit to determine i) a block allocation that indicates a plurality of contiguous tone blocks of the WLAN communication channel, and ii) respective spatial stream allocations that indicate a number of spatial streams for at least some of the plurality of contiguous tone blocks. Each of the plurality of contiguous tone blocks corresponds to a respective device set having at least one communication device and the number of spatial streams of a contiguous tone block is equal to a number of communication devices of the device set that corresponds to the contiguous tone block. The one or more integrated circuits are configured to determine an assigned contiguous tone block and spatial stream based on the block allocation and the spatial stream allocations. The one or more integrated circuits are configured to decode a data portion of a multi-user, multiple input multiple output (MU-MIMO) orthogonal frequency division multiple access (OFDMA) data unit using the assigned contiguous tone block and spatial stream.

BRIEF DESCRIPTION OF THE DRAWINGS

FIG. 10B and FIG. 10C are diagrams illustrating example codebooks represented by hierarchical codebooks, according to various embodiments.

DETAILED DESCRIPTION

Figure 1:
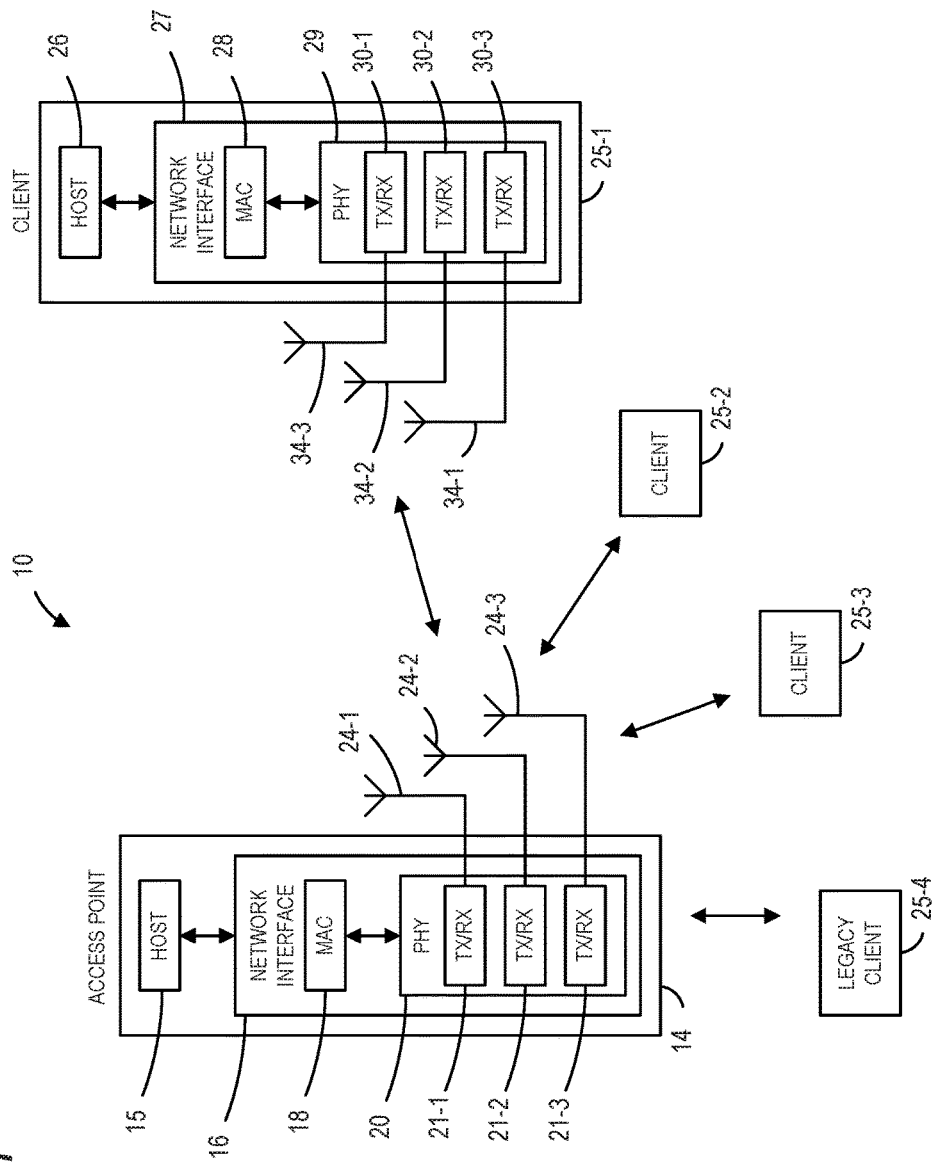
FIG. 1 is a block diagram of an example wireless local area network (WLAN), according to an embodiment.

In embodiments described below, a wireless network device such as an access point (AP) of a wireless local area network (WLAN) transmits data streams to a plurality of client stations. The AP is configured to operate with client stations according to at least a first communication protocol. The first communication protocol is sometimes referred to herein as "high efficiency Wi-Fi," "HEW" communication protocol, or 802.11ax communication protocol. In some embodiments described below, one or more client stations transmit respective data streams to an AP.

According to an embodiment, orthogonal frequency division multiplex (OFDM) symbols transmitted by the AP are generated according to a multiple access mode that partitions a WLAN communication channel into OFDM tone blocks for simultaneous communication with multiple client stations. Simultaneous transmission with the client stations provides a reduction in overhead due to non-user data within a data unit, such as training fields and signal fields, in some embodiments. In an embodiment, the HEW communication protocol defines a regular mode and a multiple access mode. The regular mode is generally used for a data unit transmitted to a single client station, while the multiple access mode is generally used for data units transmitted to multiple client stations, in an embodiment. In an embodiment, the multiple access mode is configured to use a codebook for dynamic allocation of OFDM tone blocks to groups of multiple devices where the groups have varying numbers of devices. In some embodiments, the multiple access mode includes joint multi-user, multiple input multiple output (MU-MIMO) orthogonal frequency division multiple access (OFDMA) data units. In other words, the AP transmits data units on one or more OFDM tone blocks of the WLAN communication channel via multiple spatial streams.

In various embodiments described below, a block allocation that indicates a plurality of contiguous tone blocks of a wireless local area network (WLAN) communication channel is selected for a multi-user, multiple input multiple output (MU-MIMO) orthogonal frequency division multiple access (OFDMA) data unit. In some embodiments, each of the plurality of contiguous tone blocks corresponds to a respective device set having at least one communication device. In other words, an OFDM sub-channel is allocated for one, two, or more communication devices. In some embodiments, respective spatial stream allocations are selected, for at least some of the plurality of contiguous tone blocks, that indicate a number of spatial streams for the corresponding contiguous tone block of the MU-MIMO OFDMA data unit where the number of spatial streams of a contiguous tone block is equal to a number of communication devices of the device set that corresponds to the contiguous tone block. In other words, an OFDM sub-channel allocated to a single communication device is allocated a single spatial stream, while an OFDM sub-channel allocated to a set of three communication devices is allocated three spatial streams. In some embodiments, a first field is encoded to indicate the selected block allocation and the selected spatial stream allocations and one or more second fields are encoded to indicate a respective device identifier for each communication device of the respective device sets. In some embodiments, the first field and the one or more second fields are transmitted to the communication devices of the respective device sets. In some embodiments and/or scenarios, a MU-MIMO OFDMA data unit is generated and transmitted to the communication devices of the respective device sets utilizing the selected block allocation and selected spatial streams.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., HEW communication protocol), including at least a first mode and a second mode of the first communication protocol. In some embodiments, the first mode corresponds to a multiple access mode that partitions a wider communication channel into narrower sub-bands or OFDM sub-channel blocks, and different data streams are transmitted in respective OFDM sub-channel blocks to respective client stations. OFDM sub-channel blocks are sometimes referred to herein as "OFDM tone blocks" (e.g., a block of adjacent tones or sub-carriers); however, in at least some embodiments, an OFDM tone block includes only a single sub-carrier. The multiple access mode is configured to provide a MU-MIMO OFDMA data unit that includes at least a portion of separate data streams to respective client stations. In another embodiment, the MAC processing unit 18 and the PHY processing unit 20 are also configured to operate according to a second communication protocol (e.g., IEEE 802.11ac Standard). In yet another embodiment, the MAC processing unit 18 and the PHY processing unit 20 are additionally configured to operate according to the second communication protocol, a third communication protocol, and/or a fourth communication protocol (e.g., the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 21 is/are configured to receive data units via the antenna(s) 24. The PHY processing unit 20 of the AP 14 is configured to process received data units conforming to the first communication protocol and having formats described hereinafter and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

Figure 2:
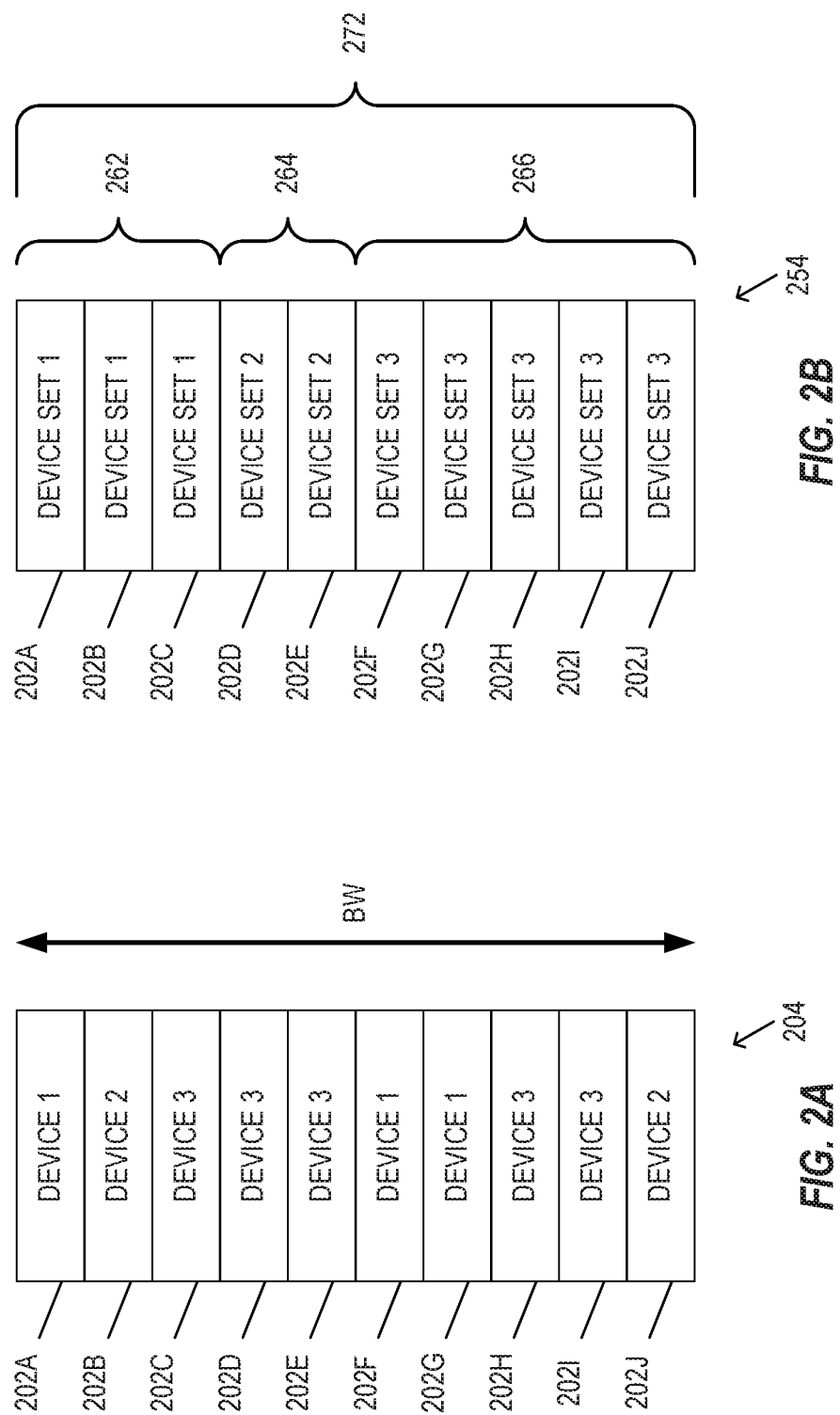
FIG. 2A is a diagram illustrating an example of orthogonal frequency division multiplexing (OFDM) sub-channel blocks of an orthogonal frequency division multiple access (OFDMA) data unit for a WLAN communication channel, according to an embodiment.
FIG. 2B is a diagram illustrating an example of OFDM sub-channel blocks of a multi-user OFDMA data unit, according to an embodiment.

FIG. 2A is a diagram illustrating an example of OFDM tone blocks 202 of an OFDMA data unit 204 for a WLAN communication channel, according to an embodiment. In an embodiment, for example, the AP 14 selects a block allocation for a group of multiple devices (DEVICE 1, DEVICE 2, and DEVICE 3) and transmits the OFDMA data unit 204 based on the block allocation. While only three devices are shown for clarity, in other embodiments, the AP 14 selects two, four, five, or another suitable number of devices for the group of multiple devices.

In the embodiment shown in FIG. 2A, the OFDMA data unit 204 occupies or "spans" a bandwidth BW of the WLAN communication channel which is sub-divided into ten OFDM tone blocks 202. In other embodiments or scenarios, a data unit similar to the data unit 204 occupies a different bandwidth, such as a 20 MHz, a 40 MHz, a 160 MHz bandwidth, or other suitable bandwidth. In some embodiments, the data unit 204 spans an entire bandwidth of the WLAN communication channel. In other embodiments, the data unit 204 spans a contiguous portion of the entire bandwidth of the WLAN communication channel.

In the embodiment shown in FIG. 2A, the OFDMA data unit 204 has a generally non-contiguous block allocation of the OFDM tone blocks to the three devices. In some embodiments, each OFDM tone block is separately signaled for each corresponding device; however, in some scenarios, this approach is less efficient for signaling overhead because each OFDM tone block requires a corresponding device identifier to indicate which device of the group of multiple devices should use the OFDM tone block. In the embodiment shown in FIG. 2A, for example, the device identifier for DEVICE 1 must be repeated for each of OFDM tone blocks 202A, 202F, and 202G, the device identifier for DEVICE 2 must be repeated for each of OFDM tone blocks 202B, and 202J, and the device identifier for DEVICE 3 must be repeated for each of OFDM tone blocks 202C, 202D, 202E, 202H, and 202I.

FIG. 2B is a diagram illustrating another example of OFDM tone blocks 202 of a multi-user OFDMA data unit 254 (e.g., a MU-MIMO OFDMA data unit), according to an embodiment. In an embodiment, for example, the AP 14 selects a block allocation and spatial stream allocation for a plurality of communication devices that includes device sets (DEVICE SET 1, DEVICE SET 2, and DEVICE SET 3) and transmits the OFDMA data unit 254 based on the block allocation and spatial stream allocation, as described above with respect to OFDMA data unit 204. However, in the embodiment shown in FIG. 2B, the AP 14 selects a generally contiguous block allocation 272 of the OFDM tone blocks 202 and uses a joint MU-MIMO and OFDMA allocation. The block allocation 272 includes respective sets of OFDM tone blocks and spatial streams for each device set of communication devices in the plurality of communication devices, for example, tone block set 262, tone block set 264, and tone block set 266 correspond to DEVICE SET 1, DEVICE SET 2, and DEVICE SET 3, respectively. In various embodiments and/or scenarios, a device sets includes a plurality of devices, for example, two, three, four, or more communication devices, that are allocated a same contiguous tone block and utilize the contiguous tone block simultaneously via respective spatial streams. In some embodiments and/or scenarios, a device set includes only a single communication device. In other words, the AP 14 allocates or assigns each of the tone block sets 262, 264, and 266 to a separate device set, each of which includes one or more communication devices. For each device set having two or more communication devices, the AP 14 utilizes a corresponding number of spatial streams to transmit different data portions to each of the communication devices of the device set. In some embodiments and/or scenarios, the AP 14 allocates a single tone block and a single spatial stream to a single communication device. In other embodiments and/or scenarios, the AP 14 allocates a single tone block and a plurality of spatial streams to a single communication device. In still other embodiments and/or scenarios, the AP 14 allocates a plurality of tone blocks and a plurality of spatial streams to a single communication device.

Figure 3:
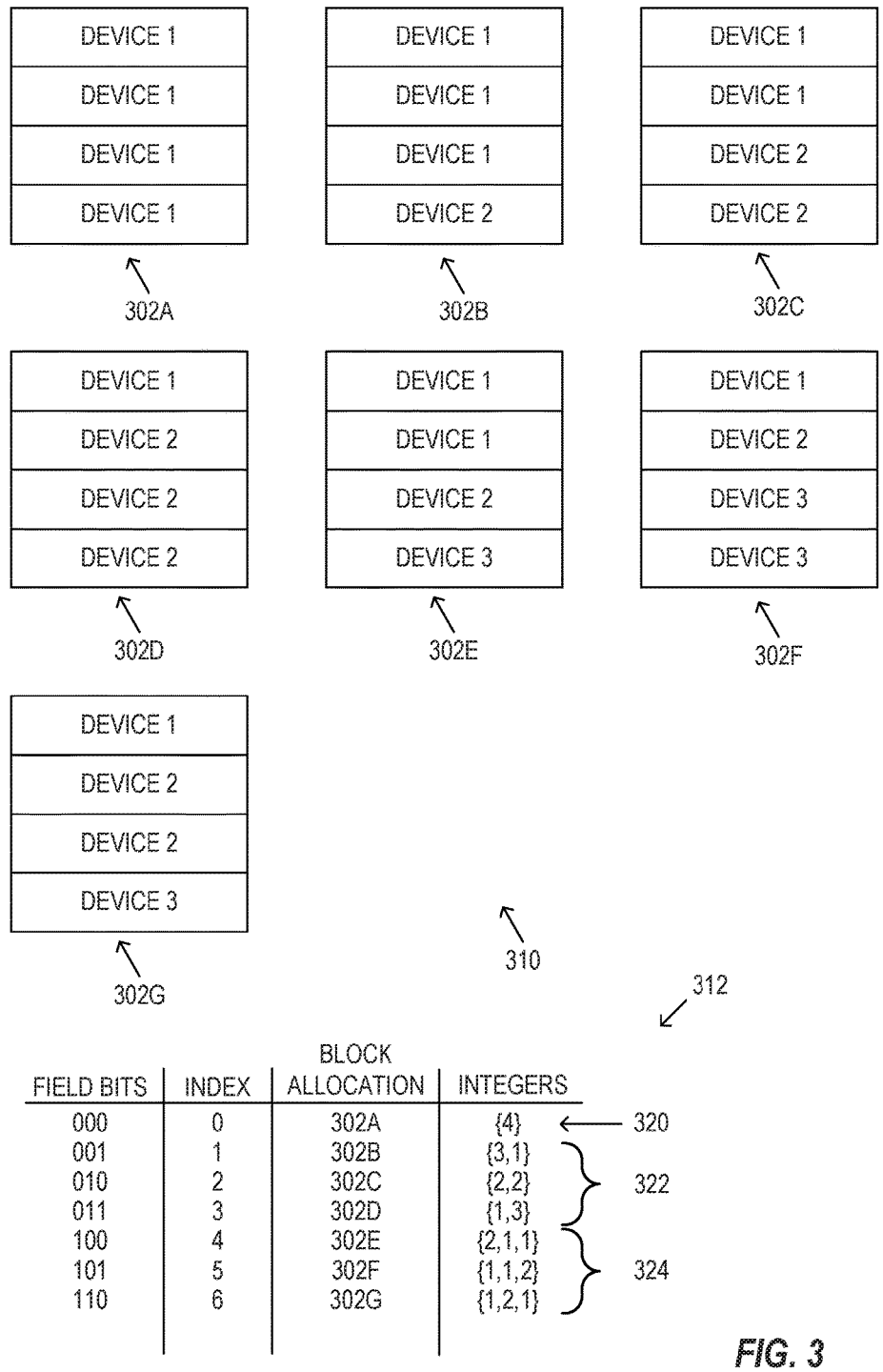
FIG. 3 is a diagram illustrating an example codebook for allocation of OFDM sub-channel blocks, according to an embodiment.

FIG. 3 is a diagram illustrating an example codebook 310 for allocation of OFDM tone blocks, according to an embodiment. Other embodiments utilizing allocations of OFDM tone blocks and spatial streams for device sets are described below. In various embodiments and/or scenarios, the codebook 310 includes a plurality of block allocations 302. In an embodiment, each of the block allocations 302 corresponds to an assignment of a predetermined maximum number of OFDM tone blocks of the WLAN communication channel to one or more devices, sometimes referred to herein as a maximum number of OFDM tone blocks N or a maximum number N. In some embodiments, the codebook 310 is configured with a suitable number of block allocations for assigning the predetermined maximum number of OFDM tone blocks to a predetermined maximum number of devices, sometimes referred to herein as a maximum number of devices K or a maximum number K. In some embodiments, the maximum number of devices K is less than or equal to the maximum number of OFDM tone blocks N.

In the embodiment shown in FIG. 3, the maximum number of OFDM tone blocks N is four and the maximum number of devices K is three. In this embodiment, four OFDM tone blocks span the entire WLAN communication channel and each block allocation 302 assigns all four OFDM tone blocks to one, two or three devices. In other embodiments, the codebook 310 is configured to use other suitable values for N and K. In some embodiments, the codebook 310 is reconfigurable, for example, by incrementing or decrementing the number of block allocations 302 within the codebook 310. In an embodiment, for example, the codebook 310 is initially generated with predetermined numbers N=10 and K=3 and updated with higher values of K (e.g., 4, 5, etc.) as additional devices request access to the WLAN communication channel, as data to be transmitted to other devices becomes available, or at other suitable times. In some embodiments, reconfiguration of the codebook 310 allows for reduced memory storage (i.e., storage of the codebook 310), processing overhead, and/or signaling overhead associated with use of the codebook 310 until additional entries of the codebook 310 are determined to be needed.

In various embodiments, each block allocation 302 of the codebook 310 corresponds to a number of devices (or device sets) in a group of multiple devices and also indicates respective integer numbers of different tone blocks of a wireless local area network (WLAN) communication channel to be assigned to each device set in the group of multiple devices. The integer numbers of different tone blocks indicate respective sets of OFDM tone blocks for each device set in the group, in various embodiments.

The AP 14 selects a number of devices in a group of multiple devices to which an OFDMA data unit is to be transmitted, in various embodiments. The selected number of devices is sometimes referred to herein as a selected number of devices n or a selected number n. In some embodiments, the AP 14 selects the number of devices n from a plurality of potential numbers of devices that are supported by the codebook 310. In some embodiments, the plurality of potential numbers of devices includes each positive integer from one to the maximum number K. For example, for a maximum number K=4, the plurality of potential numbers of devices includes numbers 1, 2, 3, and 4. In other embodiments, one or more numbers are omitted, providing a numerically ordered set of integers having at least two non-sequential integer values, for example, a plurality of potential numbers that includes 1, 2, 4, and 6 for K=6 but omits numbers 3 and 5. In some embodiments, a number is omitted in order to reduce memory storage, processing overhead, and/or signaling overhead associated with use of the codebook 310.

In some embodiments, the codebook 310 includes block allocations organized as sets of block allocations, for example, sets 320, 322, and 324. In an embodiment, each number of devices n supported by the codebook 310 corresponds to a set of block allocations. In the embodiment of FIG. 3, as one example: the set 320 includes block allocation 302A and corresponds to a selected number n=1; the set 322 includes block allocations 302B, 302C, and 302D and corresponds to a selected number n=2; and the set 324 includes block allocations 302E, 302F, and 302G and corresponds to a selected number n=3. In some embodiments, each set of block allocations includes every combination of allocating N OFDM tone blocks to a corresponding number of users. For example, for a maximum number K=4, the plurality of potential numbers of devices includes numbers 1, 2, 3, and 4. In other embodiments, one or more numbers are skipped, providing a numerically ordered set of integers having at least two non-sequential integer values, for example, a plurality of potential numbers that includes 1, 2, 4, and 6 for K=6.

In some embodiments, the codebook 310 includes a lookup table 312 that corresponds to an ordered list of the block allocations of the sets of block allocations for the plurality of potential numbers of devices. In various embodiments and/or scenarios, the AP 14 selects a block allocation from the codebook 312, for example, from the set of block allocations that corresponds to the selected number of device n, and determines an index to the codebook 312 that indicates the selected block allocation.

In an embodiment, the AP 14 encodes a first field to indicate both the selected number of devices in the group and the selected block allocation. For example, the AP 14 encodes the index to the lookup table 312 as a field in an OFDMA data unit, a management frame, or other suitable frame. In the embodiment shown in FIG. 3, the first field is encoded as a binary representation of the index. In an embodiment, the AP 14 encodes one or more second fields to indicate a respective device identifier for each device in the group of multiple devices. In various embodiments, the device identifier is a media access control (MAC) address, Internet Protocol address, user identifier, device serial number, or other suitable identifier. In some embodiments and/or scenarios, the AP 14 transmits the first field and the second field to devices of a group of multiple devices as a notification of the assignment of OFDM tone blocks. In various embodiments, the AP 14 and the group of multiple devices use the selected block allocation for an uplink OFDMA data unit, a downlink OFDMA data unit, or both uplink data units and downlink data units.

In various embodiments, the ordered list is selected to increase efficiency in encoding and/or decoding of the selected block allocation. In the embodiment shown in FIG. 3, the lookup table 312 includes an ordered list corresponding to a concatenated list of the block allocations for each of the plurality of potential numbers of devices. In another embodiment, the ordered list corresponds to an estimated frequency of use for at least some block allocations of the codebook. In an embodiment, for example, block allocations which are used with a higher frequency appear with lower values of the index.

In some embodiments, the codebook 312 includes all potential combinations of block assignments for a maximum number N OFDM tone blocks and a maximum number K devices. For example, if only one device is scheduled (e.g., assigned OFDM tone blocks), then that device is assigned $\{N\}$ OFDM tone blocks. As another example, if two devices are scheduled, the potential block allocations include $\{N-1, 1\}, \{N-2, 2\} \ldots, \{1, N-1\}$. As yet another example, if the maximum number K is scheduled, then the potential block allocations include $\{N-K+1, 1, 1, \ldots 1\}, \ldots \{1, 1, 1, \ldots, N-K+1\}$. In some scenarios, the selected number of devices n is less than the maximum number K and the j-th potential block assignment is indicated by a set of allocation blocks $A_n(j)=\{a_1 \ldots a_n\}$, where the i-th element indicates the number of OFDM tone blocks assigned to the i-th device of the group of multiple devices having a number of devices n. Using the codebook 312 as an example, the first block allocation of the set of block allocations for n=2 is $A_2(1)=\{N-1, 1\}$, which corresponds to the block allocation 302B and the index 1. When n devices are scheduled, the number of all combinations for block assignments is $C(N-1, n-1)$ where $C(n,k)$ is the binomial coefficient function. In some embodiments, $C(n,k)$ is evaluated as:

$$C(n, k) = \frac{n!}{k! \cdot (n-k)!} \quad 0 \le k \le n \quad \text{(Eqn. 1)}$$

In an embodiment, a lookup table (not shown) has a total number W of block allocations equal to:

$$W = C(N-1, 0) + C(N-1, 1) + \ldots C(N-1, K-1) \quad \text{(Eqn. 2)}$$

In this embodiment, a first field has a bit length equal to:

$$\text{ceil}\left(\log_2\left(\sum_{j=0}^{K-1} C(N-1, j)\right)\right) \quad \text{(Eqn. 3)}$$

where ceil( ) is a ceiling function. In the embodiment shown in FIG. 3, the bit length of the first field for the codebook 312 is equal to three. In various embodiments, a device that receives the first field decodes the first field to determine which allocation block $A_n(j)$ has been selected by the AP 14. For example, a first field value of "011" corresponds to the index value of 3, which indicates that the selected block allocation is block allocation 302D. The block allocation 302D indicates that there are two scheduled devices: a first scheduled device assigned a set of OFDM tone blocks having one OFDM tone block; and a second scheduled device assigned a set of OFDM tone blocks having three OFDM tone blocks.

In various embodiments, a lookup table that includes all potential combinations of block assignments for a codebook having a maximum number of OFDM tone blocks N and a maximum number of devices K is not stored in a memory, but instead the AP 14 determines an index for the codebook using an iterative process based on a tree structure, as described in U.S. application Ser. No. 14/707,898, entitled "Tone Block Allocation for Orthogonal Frequency Division Multiple Access Data Unit" and filed on May 8, 2015.

As discussed above, at least some of the block allocations 302 also utilize multiple spatial streams for devices within a device set, in various embodiments. In some embodiments, OFDM tone blocks that have at least a threshold number of tones are also available to be used with multiple spatial streams. In an embodiment, for example, the block allocations 302 of FIG. 3 having a contiguous group of three ("threshold") or more blocks are available for use with multiple spatial streams. In this embodiment, block allocation 302A, 302B, and 302D have contiguous groups for DEVICE 1, DEVICE 1, and DEVICE 2, respectively, that are available for multiple spatial streams. In an embodiment, the threshold for multiple spatial streams is 106 tones so that blocks of 106 tones, 242 tones, 484 tones, and 996 tones are available to be used with multiple spatial streams.

In some embodiments, the AP 14 appends the index of the table 312 that corresponds to a block allocation 302 with a suitable number of sub-indices or subfields that indicate a number of spatial streams allocated to the OFDM tone blocks that have at least the threshold size. In an embodiment, the number of subfields corresponds to a number of contiguous tone blocks that are actually allocated for multiple communication devices via multiple spatial streams. In other words, the AP 14 dynamically allocates spatial streams over the OFDMA data unit and includes a subfield for each contiguous tone block having multiple spatial streams. In another embodiment, the number of subfields corresponds to a maximum number of contiguous tone blocks that are available for multiple spatial streams. In an embodiment, using the above example of FIG. 3 where the threshold number is three, the maximum number is one, because only a single contiguous group (i.e., contiguous groups for DEVICE 1, DEVICE 1, and DEVICE 2 in block allocation 302A, 302B, and 302D, respectively) have sufficient size for multiple spatial streams. In another embodiment, for example, the threshold number is two for the block allocations of FIG. 3. In this embodiment, the maximum number of contiguous tone blocks that are available for multiple spatial streams is two, corresponding to block allocation 302C, and the AP appends the index of the table 312 with two subfields that each indicate the number of spatial streams for the corresponding contiguous tone block.

Figure 4:
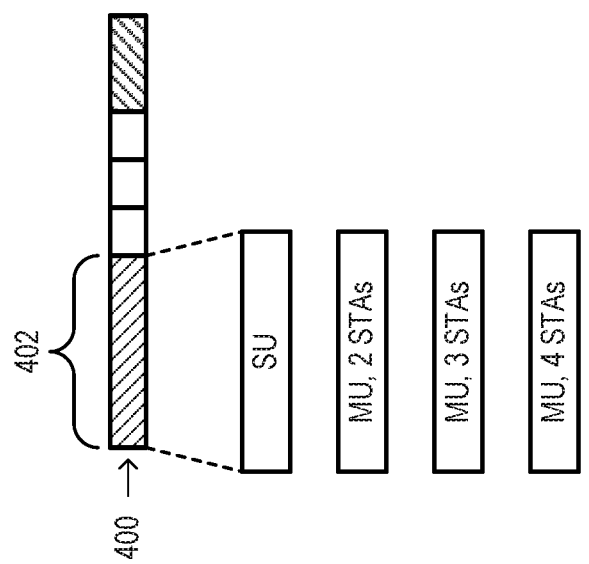
FIG. 4 is a diagram illustrating an example block allocation of an OFDMA data unit having a contiguous tone block that meets a threshold for multiple spatial streams, in an embodiment.

FIG. 4 is a diagram illustrating an example block allocation 400 of an OFDMA data unit having a contiguous tone block 402 that meets a threshold for multiple spatial streams, in an embodiment. In various embodiments, the AP 14 allocates one or more spatial streams to the contiguous tone block 402, for example, one spatial stream for one communication device, two spatial streams for two communication devices, etc. In some embodiments, the codebook 312 is modified to also indicate MU-MIMO over the OFDMA data unit. In an embodiment, where up to eight devices can be multiplexed via spatial streams, each entry within the codebook 312 that meets the threshold represents eight entries. In this embodiment, for an entry within the codebook 312 that include two contiguous OFDM tone blocks that meet the threshold, the entries represent 64 entries.

Figure 5:
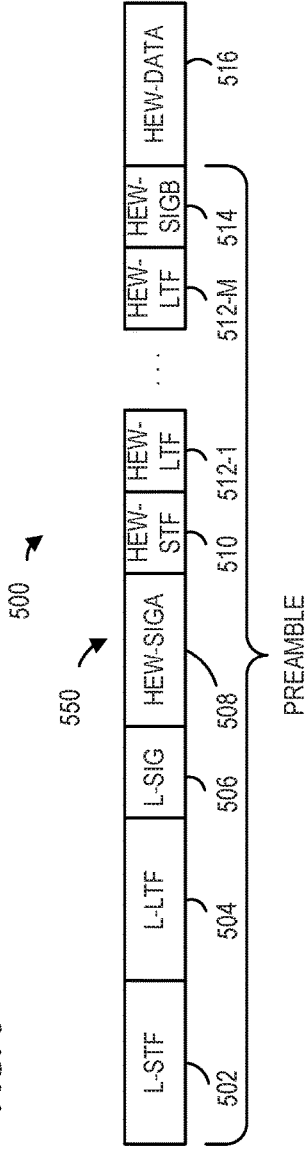
FIG. 5 is a diagram illustrating an example data unit format for an OFDMA data unit, according to an embodiment.

FIG. 5 is a diagram illustrating an example data unit format for an OFDMA data unit 500, according to an embodiment. The AP 14 is configured to transmit the data unit 500 over a communication channel to a plurality of client stations via MIMO and OFDM modulation, according to an embodiment. The AP 14 partitions the communication channel into sets of contiguous OFDM tone blocks and assigns the sets of OFDM tone blocks to a plurality of client stations as described above, in an embodiment. In some embodiments, the OFDMA data unit 500 conforms to the first communication protocol. In an embodiment, the client stations 25 are also configured to transmit the data unit 500 to the AP 14. The data unit 500 occupies a 20 MHz bandwidth. In other embodiments or scenarios, a data unit similar to the data unit 500 occupies a different bandwidth, such as a 40 MHz, an 80 MHz, or a 160 MHz bandwidth. The data unit 500 includes a preamble having a legacy short training field (L-STF) 502, a legacy long training field (L-LTF) 504, a legacy signal field (L-SIG) 506, a first non-legacy signal field (HEW-SIGA) 508, a non-legacy short training field (HEW-STF) 510, M non-legacy long training fields (HEW-LTFs) 512, where M is an integer, and a second non-legacy signal field (VHT-SIG-B) 514. The data unit 500 also includes a data portion 516.

In some embodiments, the AP 14 sets a MU-MIMO OFDMA indicator (OI) 550 in the OFDMA data unit 500 to signal the receiver that the current data unit is a downlink MU-MIMO OFDMA data unit. According to an embodiment, the MU-MIMO OFDMA indicator 550 includes the first field to indicate the selected block allocation and selected spatial stream allocations and the one or more second fields, as described above. In another embodiment, the MU-MIMO OFDMA indicator 550 includes i) the first field and ii) the one or more second fields to indicate the respective device identifiers for each device in the group of multiple devices, as described above.

In some embodiments, the MU-MIMO OFDMA indicator 550 is a single field, within the first non-legacy signal field 508, that includes the first field and the second field. In other embodiments, the first field is included in the non-legacy signal field 508 and the one or more second fields are included in the second non-legacy signal field 514. In an embodiment, the one or more second fields are explicitly included in the second non-legacy signal field 514. In another embodiment, the one or more second fields are implicitly included in the second non-legacy signal field 514. In one such embodiment, for example, instead of being a separate field, the second field is combined with the second non-legacy signal field. In another embodiment, the AP 14 performs an exclusive OR operation with the device identifier of the second field and a respective cyclic redundancy check of the second non-legacy signal field 514. In some embodiments, the cyclic redundancy check of the second non-legacy signal field 514 is included in the data portion 516.

In some embodiments, the MU-MIMO OFDMA indicator 550 includes joint coding for the selected number of devices n, the selected block allocation, the selected spatial stream allocations, and the corresponding device identifiers. In an embodiment, the MU-MIMO OFDMA indicator 550 also includes one or more PHY parameters. In an embodiment, a codebook (not shown) includes all potential combinations of device identifiers, block allocation, and spatial stream allocations for each of a plurality of potential numbers of devices. In one such embodiment, the AP 14 is configured to use a codebook as described above with respect to FIG. 3.

In an embodiment, the MU-MIMO OFDMA indicator 550 is included in a management frame. In another embodiment, the MU-MIMO OFDMA indicator 550 is included in both MU-MIMO OFDMA data units and management frames. For example, in an embodiment, the first field is included in a management frame and the one or more second fields are included in a MU-MIMO OFDMA data unit.

In some embodiments, the MU-MIMO OFDMA indicator 550 is combined with a modulation and coding scheme (MCS) indicator or other suitable sub-field. In an embodiment, for example, the regular mode corresponds to MCS values which are determined to be valid by a legacy receiver device (e.g., in compliance with IEEE 802.11ac protocol), while the multiple access mode corresponds to an MCS value that is determined to be invalid (or not supported) by the legacy receiver device (e.g., not in compliance with IEEE 802.11ac protocol). In other embodiments, the MU-MIMO OFDMA indicator 550 has a plurality of bits that indicate a plurality of regular mode MCS values and a plurality of range extension mode MCS values.

In some embodiments, the MU-MIMO OFDMA indicator 550 includes the second field as a group ID sub-field within the HEW-SIGA 508. In an embodiment, the group ID sub-field identifies an OFDMA group (i.e., a plurality of client stations intended to decode the MU-MIMO OFDMA data unit 500). In one such embodiment, the group ID sub-field includes a group ID value that indicates any of a multi-user (MU) MIMO data unit, an OFDMA data unit, or a single user data unit. In this embodiment, a separate indication field is not needed to distinguish between MU-MIMO OFDMA data units and non-OFDMA data units and thus a receiver can determine which type of data unit by parsing the group ID sub-field. In one embodiment, the group ID sub-field indicates that OFDMA and MU-MIMO are used together within a same data unit.

In an embodiment, the MU-MIMO OFDMA indicator 550 is configured to signal the MCS, number of spatial streams, a coding scheme, space time block coding, or other PHY parameters for decoding each corresponding OFDM tone block. In some embodiments, where the number of HEW-LTFs for all users in different OFDM tone blocks are the same (i.e., insertion of HEW-LTFs for padding or corresponding to a number for the largest $N_{sts}$ among client stations), the MU-MIMO OFDMA indicator 550 signals both the $N_{sts}$ of the current client station and a maximum $N_{sts}$ among all client stations.

In some embodiments, the MU-MIMO OFDMA indicator 550 includes a tone block assignment indication that indicates which OFDM tone blocks have been assigned to a client station. In an embodiment, the tone block assignment indication is a mapping table that maps a user ID to an OFDM tone block ID, as described in U.S. patent application Ser. No. 14/553,974, entitled "Orthogonal Frequency Division Multiple Access for Wireless Local Area Network" and filed on Nov. 25, 2014, the disclosure of which is incorporated herein by reference in its entirety. In some embodiments, the MU-MIMO OFDMA indicator 550 is different for subsequent MU-MIMO OFDMA data units, which allows the AP to dynamically partition and/or assign OFDM tone blocks and/or spatial streams to client stations on a per-data unit basis. In other embodiments, the tone block assignment indication and/or the spatial stream indication is omitted, for example, where the OFDM tone block assignment and spatial stream assignment are fixed for a longer duration (e.g., fixed when an OFDMA group or MU-MIMO group is formed or changed after a predetermined data units have been sent).

Figure 6:
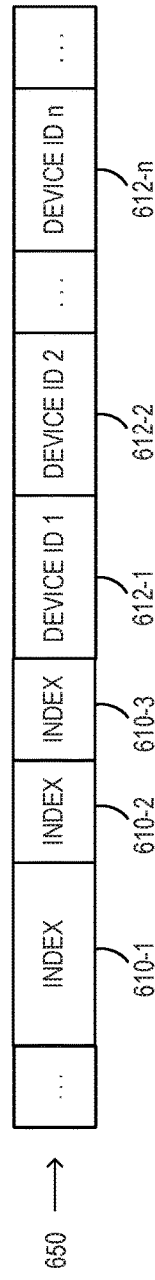
FIG. 6 is a diagram illustrating an example format of a first field and a second field of an OFDMA data unit, according to an embodiment.

FIG. 6 is a diagram illustrating an example format of a first field 610 and a second field 612 of a MU-MIMO OFDMA data unit 650, according to an embodiment. In the embodiment shown in FIG. 6, the first field 610 includes a plurality of subfields 610-1, 610-2, and 610-3 having respective indices to a plurality of hierarchical codebooks, for example, as described below with respect to FIGS. 10A, 10B, and 10C. In other embodiments, the first field 610 corresponds to an index as described above with respect to FIG. 3. The second field 612 in an embodiment includes a variable number of sub-fields that corresponds to the selected number of devices n. In an embodiment, the sub-fields of the second field 612 have respective device identifiers for each device of the device sets in a same order as the sets of OFDM tone blocks and spatial streams of the selected block allocation.

Figure 7:
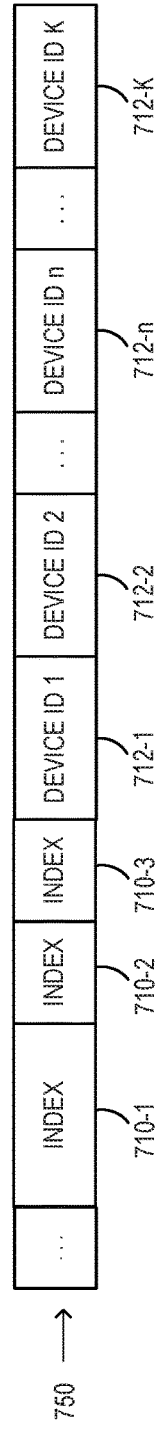
FIG. 7 is a diagram illustrating another example format of a first field and a second field of an OFDMA data unit, according to an embodiment.

FIG. 7 is a diagram illustrating another example format of a first field 710 and a second field 712 of an OFDMA data unit 750, according to an embodiment. In the embodiment shown in FIG. 7, the first field 710 includes a plurality of subfields 710-1, 710-2, and 710-3 having respective indices to a plurality of hierarchical codebooks, for example, as described below with respect to FIGS. 10A, 10B, and 10C. In other embodiments, the first field 710 corresponds to an index as described above with respect to FIG. 3. The second field 712 in an embodiment includes a predetermined number of sub-fields that corresponds to the maximum number of devices K. In some scenarios where the selected number of devices n is less than the maximum number of devices K, remaining sub-fields of the second field 712 are empty or contain a null value.

Figure 8:
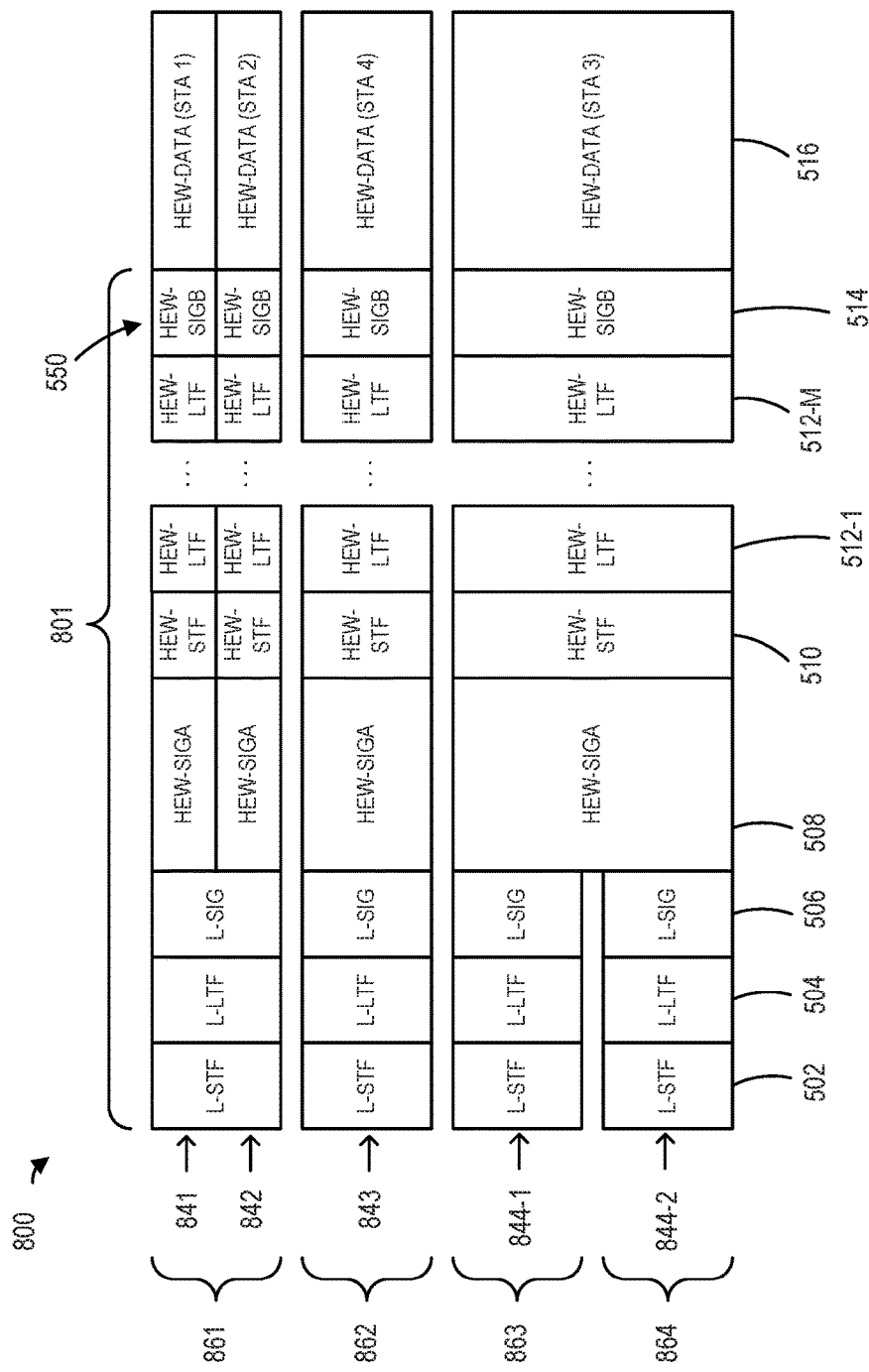
FIG. 8 is a block diagram of an example downlink OFDMA data unit, according to an embodiment.

FIG. 8 is a block diagram of an example downlink MU-MIMO OFDMA data unit 800, according to an embodiment. In FIG. 8, an 80 MHz communication channel is partitioned into four contiguous OFDM tone blocks 841, 842, 843, and 844, according to an embodiment. The OFDM tone block 841 and OFDM tone block 842 are adjacent and each have a bandwidth of 10 MHz, thus together the OFDM tone block 841 and OFDM tone block 842 span a bandwidth equal to a smallest channel bandwidth of a legacy WLAN communication protocol (i.e., a legacy tone block of 20 MHz). The OFDM tone block 843 has a bandwidth of 20 MHz. The OFDM tone block 844 spans a bandwidth of 40 MHz.

The MU-MIMO OFDMA data unit 800, and thus each OFDM data unit 841, 842, 843, and 844, includes a preamble portion 801 and a data portion 516 (e.g., a data field for the corresponding client station), in an embodiment. In other embodiments, at least some of the OFDM data units omit the data portion 516. The preamble portion 801 of each OFDM data unit is generally the same as the preamble of the OFDM data units 500 of FIG. 5. In the embodiment shown in FIG. 8, each of the HEW-SIGB fields 514 includes a respective OFDMA indicator 550. For example, each OFDMA indicator 550 includes the second field with a device identifier for the corresponding device of the first group of multiple devices.

In an embodiment, each 20 MHz sub-band (i.e., a legacy tone block) of the communication channel includes a legacy portion 802 having an L-STF 502, L-LTF 504, and L-SIG 506 such that a legacy client station can properly decode the L-SIG field 506 for the 20 MHz sub-band. In the embodiment of FIG. 8, a first legacy tone block 861 spans the OFDM tone blocks 841 and 842, a second legacy tone block 862 spans the OFDM tone block 843, a third legacy tone block 863 spans a portion 844-1 of the OFDM tone block 844, and a fourth legacy tone block 864 spans a portion 844-2 of the OFDM tone block 844. In an embodiment, the legacy portion 802 of the OFDM data units 841 and 842 span a same 20 MHz sub-band (i.e., the legacy tone block 861) and thus overlap in frequency. In this embodiment, the OFDM data units 841 and 842 use a same legacy portion 802.

The L-SIG field 506 corresponding to each legacy tone block 861, 862, 863, and 864 indicates a duration for OFDM data units within the respective legacy tone block, in an embodiment. In some embodiments, the L-SIG fields 506 corresponding to each legacy tone block of the MU-MIMO OFDMA data unit 800 have identical values, for example, where the corresponding OFDM data units have a same duration (e.g., due to OFDM symbol padding). In other embodiments, the L-SIG fields 506 of the legacy tone blocks have at least some different values. In an embodiment where channel bonding is used and a client station is assigned multiple OFDM tone blocks, the L-SIG fields corresponding to different 20 MHz sub-bands that contain the OFDM tone blocks assigned to the same client station have a same L-LENGTH value such that each L-LENGTH value decoded by the client station indicates a same packet duration. For example, in the embodiment of FIG. 8, an L-LENGTH value of the L-SIG field 506 of OFDM data units 841 and 843 indicate a same value.

Figure 9:
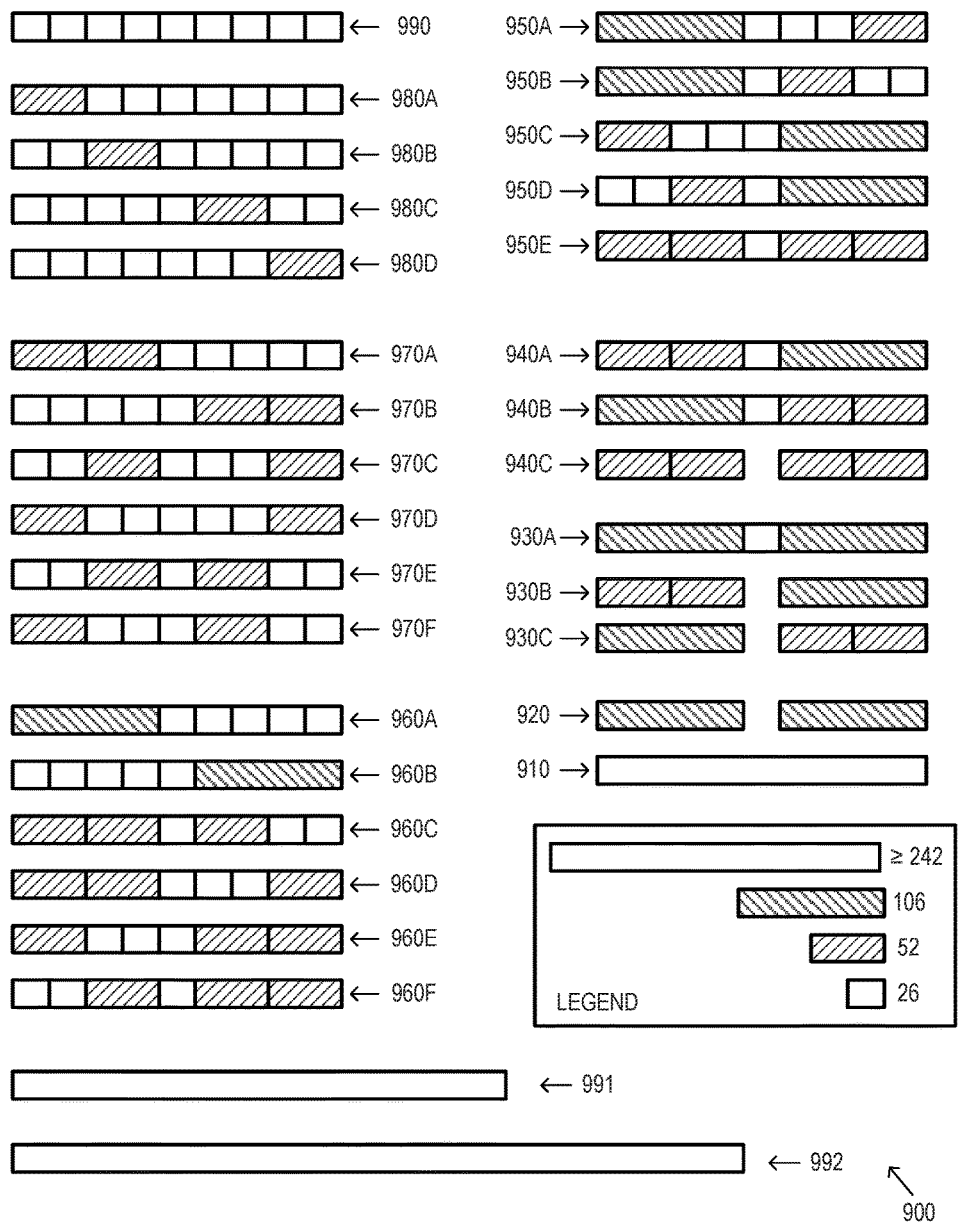
FIG. 9 is a diagram illustrating an example codebook for allocation of OFDM sub-channel blocks, according to an embodiment.

FIG. 9 is a diagram illustrating an example codebook 900 for allocation of OFDM tone blocks, according to an embodiment. In some embodiments, the codebook 900 includes fixed sizes of sets of OFDM tone blocks that can be allocated: 26×1, 26×2 (52), 106, 242, 484, 996, or 996×2. In various embodiments, some predetermined sizes of OFDM tone blocks are available as single user or multi-user OFDM tone blocks. For example, OFDM tone blocks having 106 or more tones (e.g., that meet the threshold) are available for allocation as a single user tone block or a multi-user tone block. In various embodiments, a multi-user tone block provides a joint MU-MIMO and OFDMA resource allocation for one, two, three, four, five, six, seven, eight, or more users.

In an embodiment, each set of OFDM tone blocks for the codebook 900 can only be scheduled on designated subcarriers. In the embodiment shown in FIG. 9, the codebook 900 includes sets of block allocations 910, 920, 930, 940, 950, 960, 970, 980, and 990 for n=1 . . . 9. Each set of block allocations indicates all valid allocations of Ω(n) within a span of 20 MHz. In some embodiments, one or more block allocations which are not fully assigned are also included as special cases for flexibility in allocating the OFDM tone blocks, for example, range extension tone blocks or wide code blocks (e.g., greater than 20 MHz).

In an embodiment, the codebook 900 is configured as a lookup table for all potential block allocations for each 20 MHz span of the communication channel, with special entries for a 484-tone block allocation (e.g., special entry 991), and an 996-tone block allocation (e.g., special entry 992). In the embodiment of FIG. 9, the lookup table has 29 entries which are represented by an index having 5 bits. The AP 14 encodes 5 bits as a codebook index for each span of 20 MHz of the communication channel, in an embodiment. In an embodiment, the AP 14 encodes the 5 bits with the special entry 991 to indicate that a 40 MHz span is scheduled to a single device or MU-MIMO group of devices. In this embodiment, signaling for an adjacent 20 MHz span is omitted. In another embodiment, the AP 14 encodes the 5 bits with the special entry 992 to indicate that an 80 MHz span is scheduled to a single device or MU-MIMO group of devices. In this embodiment, signaling for an adjacent 60 MHz span is omitted.

As discussed above, incorporating multiple spatial streams for contiguous tone blocks meeting the threshold increases the number of entries in the table. In the embodiment shown in FIG. 9 using a threshold of 106 tones, as an example, each entry including a contiguous tone block that meets the threshold becomes eight entries corresponding to up to eight spatial streams. The codebook 900 without using multiple spatial streams occupies 32 entries. With a threshold of 106 tones and a maximum number of spatial streams of eight, a total of thirteen entries (entries 910, 930B, 930C, 940A, 940B, 950A, 950B, 950C, 950D, 960A, 960B, 991, and 992) have a single multiuser tone block and thus receive seven additional entries, while a total of two entries (entries 920 and 930A) have two multiuser tone blocks and thus receive 63 additional entries, for 249 total entries (32+7*13+63*2). In some embodiments, the 249 entries are represented by eight bits. In an embodiment, remaining entries of the codebook 900 that can be represented by the eight bits (e.g., up to 256 entries) are filled using other block allocations (not shown), for example, a block allocation that includes one or more 26 tone blocks utilized for range extension. In other embodiments, different numbers of spatial streams are utilized for tone blocks meeting the threshold. In an embodiment, the codebook 900 includes entries for one, two, three, or four spatial streams for tone blocks that meet the threshold. In another embodiment, the codebook 900 includes entries for one, two, four, and eight spatial streams, which corresponds to 101 entries (32+3*13+15*2) which is represented by seven bits and has 27 remaining entries. In embodiment, at least some of the remaining entries are filled using other block allocations, as described above. In other embodiments, other suitable numbers of spatial streams, thresholds, and bits that represent the codebook 900 are utilized.

Figure 10A:
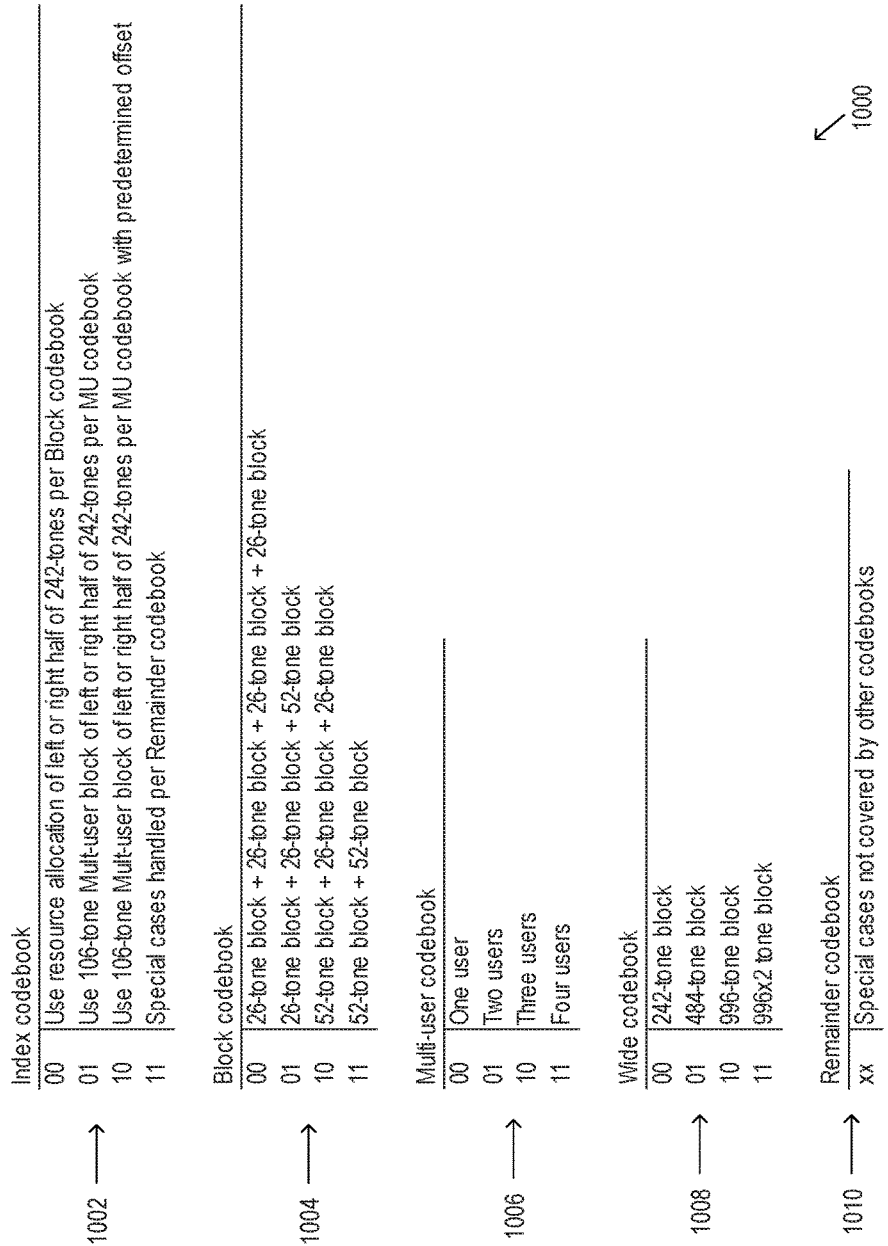
FIG. 10A is a diagram of an example plurality of hierarchical codebooks, according to an embodiment.

FIG. 10A is a diagram of an example plurality of hierarchical codebooks 1000, according to an embodiment. FIG. 10B and FIG. 10C are diagrams illustrating example codebooks 1050 and 1080, respectively, represented by the plurality of hierarchical codebooks 1000, according to various embodiments. The plurality of hierarchical codebooks 1000 provide a structural codebook that utilizes less memory as compared to the codebook 900, in an embodiment. In some embodiments, the plurality of codebooks 1000 each correspond to different content, for example, block allocations, spatial stream allocations, or bandwidth allocations. In an embodiment, a codebook of the plurality of codebooks 1000 corresponds to timeslot indications, priority indications, group identifiers, or device identifiers. In an embodiment, an overall codebook, similar to the codebook 900, is provided by a "multiplication" of sub-indices or subfields that reference the plurality of codebooks 1000.

In the embodiment shown in FIG. 10A, the plurality of hierarchical codebooks 1000 includes an index codebook 1002, a block allocation codebook 1004, a multi-user codebook 1006, a wide codebook 2008, and a remainder codebook 1010. In an embodiment, the AP 14 generates a field for a MU-MIMO OFDMA indicator that includes a first subfield and one or more second subfields. In an embodiment, the first subfield includes an index to the index codebook 1002 which indicates which of the plurality of hierarchical codebooks 1000 are indexed by the one or more second subfields.

The block allocation codebook 1004 indicates predetermined block allocations, in various embodiments. In the embodiment shown in FIG. 10A, the block allocation codebook 1004 includes two bits which indicate one of four available block allocations for at least a portion of a smallest channel bandwidth of a legacy WLAN communication protocol (e.g., 20 MHz): 00—four 26-tone blocks; 01—two 26-tone blocks and a 52-tone block; 10—one 52-tone block and two 26-tone blocks; and 11—two 52-tone blocks. In the embodiment shown in FIG. 10A, the portion includes 106 tones of a 20 MHz channel and correspond to a left portion or right portion (opposite a center 26-tone block) of a 242-tone block that spans the 20 MHz channel.

The multi-user codebook 1006 indicates predetermined spatial stream allocations, in various embodiments. In the embodiment shown in FIG. 10A, the multi-user codebook 1006 includes two bits which indicate a number of spatial streams for an allocated tone block: 00—One user or spatial stream; 01—Two users or spatial streams; 10—Three users or spatial streams; 11—Four users or spatial streams. In some embodiments, multiple spatial streams are allocated to a same communication device. In some embodiments and/or scenarios, the AP 14 applies an offset to the number of spatial streams indicated by the multi-user codebook 1006. In an embodiment, for example, the AP 14 adds an offset of four to the number of spatial streams indicated by the multi-user codebook 1006, which results in a range of spatial streams from four to eight spatial streams.

The wide codebook 1008 indicates predetermined block allocations for a WLAN communication channel that is larger than a smallest channel bandwidth of a legacy WLAN communication protocol, in various embodiments. In the embodiment shown in FIG. 10A, the wide codebook 1008 includes two bits which indicate a contiguous block width: 00—242-tone block (e.g., 20 MHz); 01—484-tone block (e.g., 40 MHz); 10—996-tone block (e.g., 80 MHz); 11—996×2 tone block (e.g., 80 MHz×2).

The remainder codebook 1010 indicates other combinations of block allocations and spatial stream allocations that are not readily described by the block allocation codebook 1004, the multi-user codebook 1006, or the wide codebook 1008, in various embodiments. In an embodiment, the remainder codebook 1010 includes one or more entries that indicate a portion of the WLAN communication channel that is to be used for a range extension mode. Examples of a range extension mode are described in U.S. patent application Ser. No. 14/523,678, entitled "Range Extension Mode for WiFi" and filed on Feb. 9, 2016, the disclosure of which is incorporated herein by reference in its entirety.

The codebook 1050 of FIG. 10B shows an example mapping of a first field to the plurality of hierarchical codebooks 1000, in an embodiment. In some embodiments, the first field corresponds to the first field 610 or the first field 710, having a plurality of subfields with respective indices for codebooks of the plurality of hierarchical codebooks 1000. In the embodiment shown in FIG. 10B, the first field has eight bits and includes a first subfield (column 1052; four bits, B0-B3), a second subfield (column 1054; two bits, B4-B5), and a third subfield (column 1056; two bits, B6-B7), where the second and third subfields are the "one or more second subfields" referred to above. In other words, the first subfield in column 1052 indicates (via the index codebook 1002) which codebook (of the codebooks 1004, 1006, 1008, or 1010) should be used to interpret the values of the second subfield in column 1054 and the third subfield in column 1056.

The second subfield in column 1054 and the third subfield in column 1056 generally refer to a left portion and a right portion as illustrated in the figures, respectively, of a 20 MHz WLAN communication channel, in an embodiment. In the embodiment shown in FIG. 10B, the codebook 1050 also includes a column 1058 that indicates how the center 26-tone block is to be allocated. In the embodiment shown in FIG. 10B, the center 26-tone block is allocated based on a combination of the second subfield and the third subfield. In another embodiment, the block allocation codebook 1004 includes an entry that allocates the center 26-tone block.

As a first example, for a first field value of 00001011, the first subfield is 0000, the second subfield is 10, and the third subfield is 11. In this first example, the left portion is allocated according to a single user (i.e., single spatial stream) configuration using the block allocation codebook 1004 (as shown in column 1054), the right portion is allocated to a single user configuration using the block allocation codebook 1004 (as shown in column 1056), and the center 26-tone block is allocated (as shown in column 1058). In the first example, the left portion has a block allocation of a 52-tone block, a 26-tone block, and a 26-tone block (row "10" of codebook 1004), the center portion has a 26-tone block, and the right portion has a block allocation of a 52-tone block and a 52-tone block, thus the first example generally corresponds to the block allocation 960E as shown in FIG. 9.

As a second example, for a first field value of 00101100, the first subfield is 0100, the second subfield is 11, and the third subfield is 00. In this second example, the left portion is allocated to a single user configuration using the block allocation codebook 1004 (as shown in column 1054), the right portion is allocated to a multi-user configuration using the multi-user codebook 1006 with an offset (as shown in column 1056), and the center 26-tone block is allocated (as shown in column 1058). In the second example, the left portion has a block allocation of a 52-tone block and a 52-tone block (row "11" of codebook 1004), the center portion has a 26-tone block, and the right portion has a block allocation of a 106-tone block with five spatial streams (row "00" of codebook 1006 with an offset of four), thus the second example generally corresponds to the block allocation 940A as shown in FIG. 9 with five spatial streams for the right portion.

As a third example, for a first field value of 11011011, the first subfield is 1101, the second subfield is 10, and the third subfield is 11. In this third example, the WLAN communication is allocated with a 996-tone block (row "10" of codebook 1008) and eight spatial streams (row "11" of codebook 1006), thus the third example generally corresponds to the block allocation 992 as shown in FIG. 9 with eight spatial streams.

The codebook 1080 of FIG. 10C shows another example mapping of a first field to the plurality of hierarchical codebooks 1000, in an embodiment. In the embodiment shown in FIG. 10C, the first field has eight bits and includes a first subfield (column 1082; four bits, B0-B3), a second subfield (column 1084; two bits, B4-B5), and a third subfield (column 1086; two bits, B6-B7). The codebook 1080 is generally similar to the codebook 1050, but includes different mappings for rows 0011, 0111, 1011, and 1111.

Although the codebooks 1050 and 1080 have the first, second, and third subfields in the embodiments shown in FIG. 10B and FIG. 10C, the third subfield is omitted in other embodiments. In still other embodiments, one or more additional subfields (not shown) are added. In an embodiment, for example, a center block codebook (not shown) indicates how the center 26-tone block should be allocated. In an embodiment, a range extension codebook (not shown) indicates a range extension configuration for one or more tone blocks.

Figure 11:
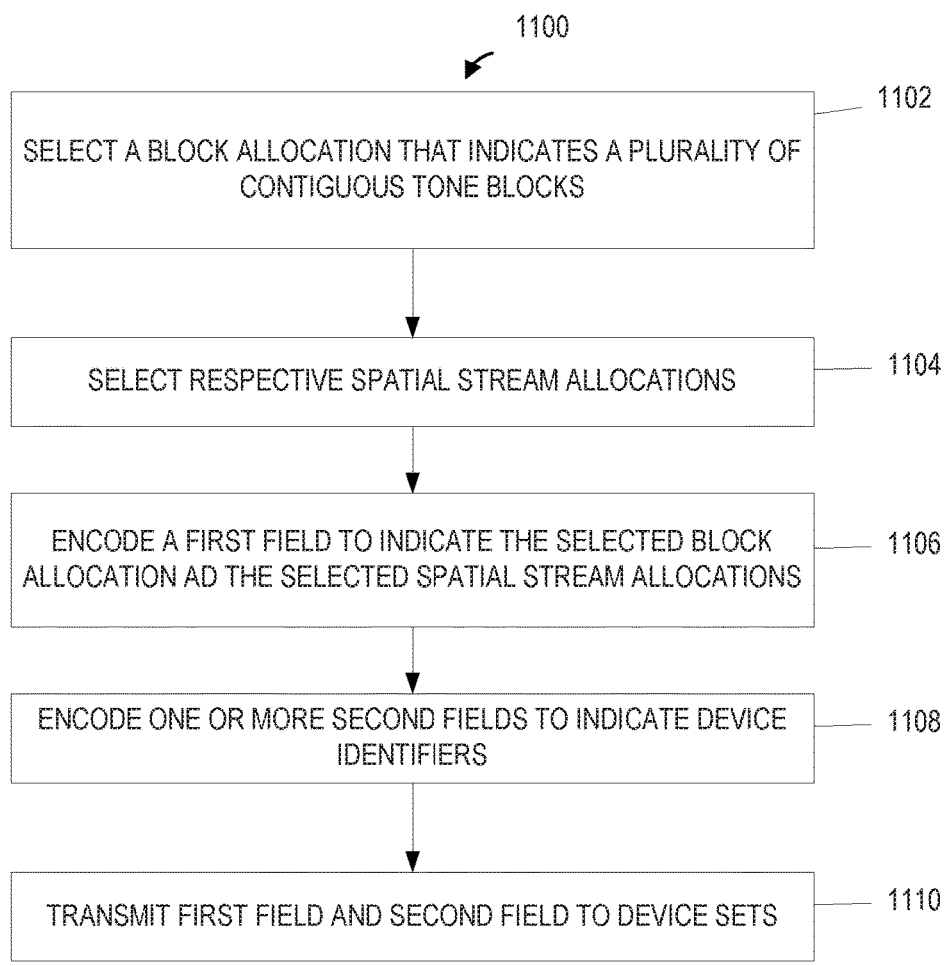
FIG. 11 is a flow diagram of an example method for encoding a first field to indicate a selected block allocation and respective spatial streams for a MU-MIMO OFDMA data unit, according to an embodiment.

FIG. 11 is a flow diagram of an example method 1100 for encoding a first field to indicate a selected block allocation and respective spatial streams for a MU-MIMO OFDMA data unit, according to an embodiment. With reference to FIG. 1, the method 1100 is implemented by the network interface 16, in an embodiment. For example, in one such embodiment, the PHY processing unit 20 is configured to implement the method 1100. According to another embodiment, the MAC processing 18 is also configured to implement at least a part of the method 1100. With continued reference to FIG. 1, in yet another embodiment, the method 1100 is implemented by the network interface 27 (e.g., the PHY processing unit 29 and/or the MAC processing unit 28). In other embodiments, the method 1100 is implemented by other suitable network interfaces.

At block 1102, a block allocation that indicates a plurality of contiguous tone blocks of a wireless local area network (WLAN) communication channel for a multi-user, multiple input multiple output (MU-MIMO) orthogonal frequency division multiple access (OFDMA) data unit is selected, in an embodiment. In an embodiment, each of the plurality of contiguous tone blocks corresponds to a respective device set having at least one communication device. In some embodiments, the block allocation corresponds to the block allocation for the multi-user OFDMA data unit 254 of FIG. 2B or the block allocations described above with respect to FIG. 11A, 11B, or 11C.

At block 1104, respective spatial stream allocations that indicate a number of spatial streams for the corresponding contiguous tone block of the MU-MIMO OFDMA data unit are selected for at least some of the plurality of contiguous tone blocks, in an embodiment. The number of spatial streams of a contiguous tone block is equal to a number of communication devices of the device set that corresponds to the contiguous tone block, in an embodiment. In some embodiments, the spatial stream allocations correspond to the spatial stream allocations for the multi-user OFDMA data unit 254 of FIG. 2B or the spatial stream allocations described above with respect to FIG. 11A, 11B, or 11C.

At block 1106, a first field is encoded to indicate the selected block allocation and the selected spatial stream allocations, in an embodiment. In some embodiment, the first field corresponds to the non-legacy signal field 508, as described above with respect to FIG. 5. In an embodiment, for example, the first field corresponds to the first field 610 or the first field 710, as described above with respect to FIG. 6 and FIG. 7.

At block 1108, one or more second fields are encoded to indicate a respective device identifier for each communication device of the respective device sets, in an embodiment. In an embodiment, for example, the second field corresponds to the second field 612 or the second field 712, as described above with respect to FIG. 6 and FIG. 7.

At block 1110, the first field and the one or more second fields are transmitted to the communication devices of the respective device sets, in an embodiment.

Figure 12:
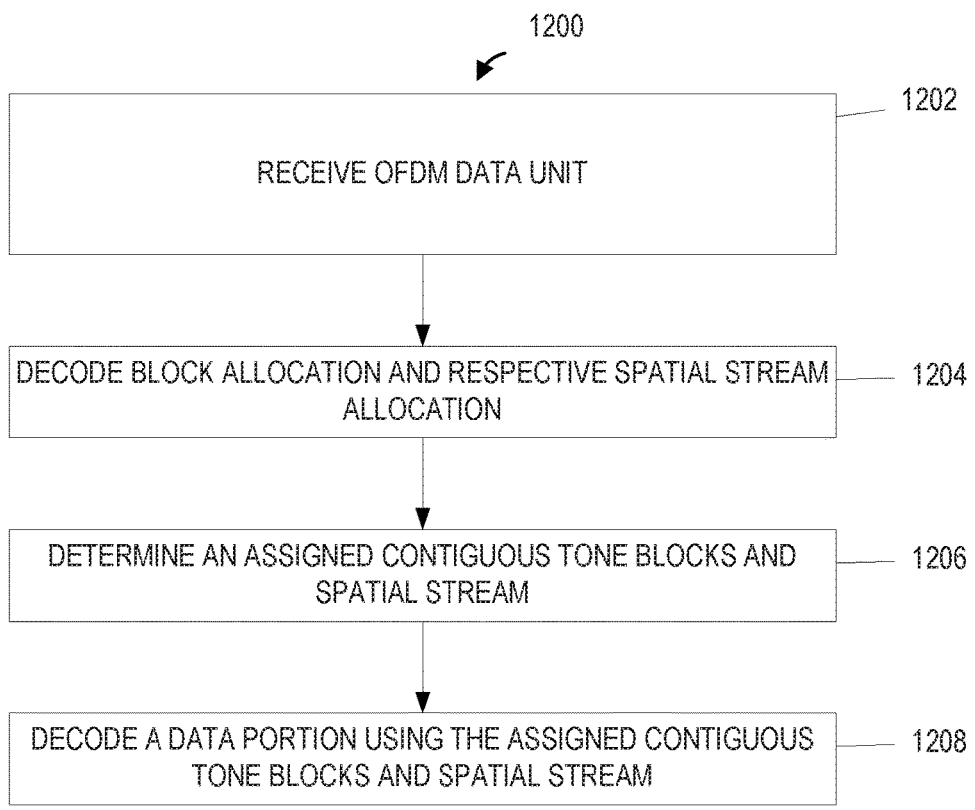
FIG. 12 is a flow diagram of an example method for decoding a data portion of a MU-MIMO OFDMA data unit, according to an embodiment.

FIG. 12 is a flow diagram of an example method 1200 for decoding a data portion of a MU-MIMO OFDMA data unit, according to an embodiment. With reference to FIG. 1, the method 1200 is implemented by the network interface 16, in an embodiment. For example, in one such embodiment, the PHY processing unit 20 is configured to implement the method 1200. According to another embodiment, the MAC processing 18 is also configured to implement at least a part of the method 1200. With continued reference to FIG. 1, in yet another embodiment, the method 1200 is implemented by the network interface 27 (e.g., the PHY processing unit 29 and/or the MAC processing unit 28). In other embodiments, the method 1200 is implemented by other suitable network interfaces.

At block 1202, an orthogonal frequency division multiple orthogonal frequency division multiplex (OFDM) data unit is received via a wireless local area network (WLAN) communication channel, in an embodiment. In some embodiments, the OFDM data unit corresponds to the OFDM data unit 500, 650, 750, 800, or 900, as described above with respect to FIGS. 5, 6, 7, 8, and 9.

At block 1204, a non-legacy signal field of the OFDM data unit is decoded to determine i) a block allocation that indicates a plurality of contiguous tone blocks of the WLAN communication channel, and ii) respective spatial stream allocations that indicate a number of spatial streams for at least some of the plurality of contiguous tone blocks, in an embodiment. In an embodiment, each of the plurality of contiguous tone blocks corresponds to a respective device set having at least one communication device, and the number of spatial streams of a contiguous tone block is equal to a number of communication devices of the device set that corresponds to the contiguous tone block. In an embodiment, the non-legacy signal field corresponds to the non-legacy signal field 508, as described above with respect to FIG. 5.

At block 1206, an assigned contiguous tone block and spatial stream are determined based on the block allocation and the spatial stream allocations.

At block 1208, a data portion of a multi-user, multiple input multiple output (MU-MIMO) orthogonal frequency division multiple access (OFDMA) data unit is decoded using the assigned contiguous tone block and spatial stream.

In an embodiment, the MU-MIMO OFDMA data unit includes the OFDM data unit and thus includes the non-legacy signal field. In some embodiments, the MU-MIMO OFDMA data unit is different from the OFDM data unit that includes the non-legacy signal field. In an embodiment, for example, the OFDM data unit is a management frame that is transmitted before the MU-MIMO OFDMA data unit.

In some embodiments, decoding the non-legacy signal field of the OFDM data unit includes decoding a first field of the non-legacy signal field that includes a plurality of subfields having respective indices to a plurality of hierarchical codebooks. In one such embodiment, for example, the plurality of hierarchical codebooks indicate predetermined block allocations and predetermined spatial stream allocations and the block allocation and the spatial stream allocations are selected from the plurality of hierarchical codebooks, as described above with respect to FIGS. 11A, 11B, and 11C.

In an embodiment, the plurality of subfields include a first subfield and one or more second subfields, the plurality of hierarchical codebooks includes i) a block allocation codebook that indicates the predetermined block allocations, ii) a multi-user codebook that indicates the predetermined spatial stream allocations, and iii) an index codebook that indicates which of the plurality of hierarchical codebooks are indexed by the one or more second subfields, the first subfield has an index to the index codebook, as described above with respect to FIGS. 11A, 11B, and 11C.

Further aspects of the present invention relate to one or more of the following clauses.

In an embodiment, a method includes selecting a block allocation that indicates a plurality of contiguous tone blocks of a wireless local area network (WLAN) communication channel for a multi-user, multiple input multiple output (MU-MIMO) orthogonal frequency division multiple access (OFDMA) data unit. Each of the plurality of contiguous tone blocks corresponds to a respective device set having at least one communication device. The method includes selecting, for at least some of the plurality of contiguous tone blocks, respective spatial stream allocations that indicate a number of spatial streams for the corresponding contiguous tone block of the MU-MIMO OFDMA data unit. The number of spatial streams of a contiguous tone block is equal to a number of communication devices of the device set that corresponds to the contiguous tone block. The method also includes encoding a first field to indicate the selected block allocation and the selected spatial stream allocations. The method includes encoding one or more second fields to indicate a respective device identifier for each communication device of the respective device sets. The method also includes transmitting the first field and the one or more second fields to the communication devices of the respective device sets.

In other embodiments, the method includes any suitable combination of one or more of the following features.

The first field includes a plurality of subfields having respective indices to a plurality of hierarchical codebooks that indicate predetermined block allocations and predetermined spatial stream allocations; and the selected block allocation and the selected spatial stream allocations are selected from the plurality of hierarchical codebooks.

The plurality of subfields includes a first subfield and one or more second subfields; the plurality of hierarchical codebooks includes i) a block allocation codebook that indicates the predetermined block allocations, ii) a multi-user codebook that indicates the predetermined spatial stream allocations, and iii) an index codebook that indicates which of the plurality of hierarchical codebooks are indexed by the one or more second subfields; and the first subfield has an index to the index codebook.

The plurality of hierarchical codebooks include a wide codebook that indicates the predetermined block allocations for a WLAN communication channel that is larger than a smallest channel bandwidth of a legacy WLAN communication protocol.

The first field includes i) a first subfield that indicates the selected block allocation and the number of the plurality of contiguous blocks, and ii) a second subfield that indicates the selected spatial stream allocations.

Selecting the respective spatial stream allocations includes selecting the at least some of the plurality of contiguous tone blocks from the plurality of contiguous tone blocks having at least a threshold number of contiguous tones.

A total number of communication devices of the respective device sets is larger than i) the number of the plurality of contiguous blocks, and ii) a maximum of the number of spatial streams for the at least some of the plurality of contiguous tone blocks.

The method further includes: generating the MU-MIMO OFDMA data unit based on the selected block allocation and the selected spatial stream allocations; and transmitting the MU-MIMO OFDMA data unit to the communication devices of the respective device sets.

In another embodiment, an apparatus includes a network interface device having one or more integrated circuits. The one or more integrated circuits are configured to select a block allocation that indicates a plurality of contiguous tone blocks of a wireless local area network (WLAN) communication channel for a multi-user, multiple input multiple output (MU-MIMO) orthogonal frequency division multiple access (OFDMA) data unit. Each of the plurality of contiguous tone blocks corresponds to a respective device set having at least one second communication device. The one or more integrated circuits are configured to select, for at least some of the plurality of contiguous tone blocks, respective spatial stream allocations that indicate a number of spatial streams for the corresponding contiguous tone block of the MU-MIMO OFDMA data unit. The number of spatial streams of a contiguous tone block is equal to a number of communication devices of the device set that corresponds to the contiguous tone block. The one or more integrated circuits are configured to encode a first field to indicate the selected block allocation and the selected spatial stream allocations. The one or more integrated circuits are configured to encode one or more second fields to indicate a respective device identifier for each communication device of the respective device sets. The one or more integrated circuits are configured to transmit the first field and the one or more second fields to the communication devices of the respective device sets.

In other embodiments, the apparatus includes any suitable combination of one or more of the following features.

The first field includes a plurality of subfields having respective indices to a plurality of hierarchical codebooks; the plurality of hierarchical codebooks indicate predetermined block allocations and predetermined spatial stream allocations; and the selected block allocation and the selected spatial stream allocations are selected from the plurality of hierarchical codebooks.

The plurality of subfields includes a first subfield and one or more second subfields; the plurality of hierarchical codebooks includes i) a block allocation codebook that indicates the predetermined block allocations, ii) a multi-user codebook that indicates the predetermined spatial stream allocations, and iii) an index codebook that indicates which of the plurality of hierarchical codebooks are indexed by the one or more second subfields; and the first subfield has an index to the index codebook.

The plurality of hierarchical codebooks include a wide codebook that indicates the predetermined block allocations for a WLAN communication channel that is larger than a smallest channel bandwidth of a legacy WLAN communication protocol.

The first field includes i) a first subfield that indicates the selected block allocation and the number of the plurality of contiguous blocks, and ii) a second subfield that indicates the selected spatial stream allocations.

The one or more integrated circuits are configured to select the at least some of the plurality of contiguous tone blocks from the plurality of contiguous tone blocks having at least a threshold number of contiguous tones.

A total number of communication devices of the respective device sets is larger than i) the number of the plurality of contiguous blocks, and ii) a maximum of the number of spatial streams for the at least some of the plurality of contiguous tone blocks.

The one or more integrated circuits are configured to: generate the MU-MIMO OFDMA data unit based on the selected block allocation and the selected spatial stream allocations; and transmit the MU-MIMO OFDMA data unit to the communication devices of the respective device sets.

In yet another embodiment, a method includes receiving an orthogonal frequency division multiple orthogonal frequency division multiplex (OFDM) data unit via a wireless local area network (WLAN) communication channel. The method also includes decoding a non-legacy signal field of the OFDM data unit to determine i) a block allocation that indicates a plurality of contiguous tone blocks of the WLAN communication channel, and ii) respective spatial stream allocations that indicate a number of spatial streams for at least some of the plurality of contiguous tone blocks. Each of the plurality of contiguous tone blocks corresponds to a respective device set having at least one communication device and the number of spatial streams of a contiguous tone block is equal to a number of communication devices of the device set that corresponds to the contiguous tone block. The method includes determining an assigned contiguous tone block and spatial stream based on the block allocation and the spatial stream allocations. The method includes decoding a data portion of a multi-user, multiple input multiple output (MU-MIMO) orthogonal frequency division multiple access (OFDMA) data unit using the assigned contiguous tone block and spatial stream.

In other embodiments, the method includes any suitable combination of one or more of the following features.

Decoding the non-legacy signal field of the OFDM data unit includes decoding a first field of the non-legacy signal field that includes a plurality of subfields having respective indices to a plurality of hierarchical codebooks. The plurality of hierarchical codebooks indicate predetermined block allocations and predetermined spatial stream allocations; and the block allocation and the spatial stream allocations are selected from the plurality of hierarchical codebooks.

The plurality of subfields includes a first subfield and one or more second subfields; the plurality of hierarchical codebooks includes i) a block allocation codebook that indicates the predetermined block allocations, ii) a multi-user codebook that indicates the predetermined spatial stream allocations, and iii) an index codebook that indicates which of the plurality of hierarchical codebooks are indexed by the one or more second subfields; and the first subfield has an index to the index codebook.

In another embodiment, an apparatus includes a network interface device having one or more integrated circuits. The one or more integrated circuits are configured to receive an orthogonal frequency division multiple orthogonal frequency division multiplex (OFDM) data unit via a wireless local area network (WLAN) communication channel. The one or more integrated circuits are configured to decode a non-legacy signal field of the OFDM data unit to determine i) a block allocation that indicates a plurality of contiguous tone blocks of the WLAN communication channel, and ii) respective spatial stream allocations that indicate a number of spatial streams for at least some of the plurality of contiguous tone blocks. Each of the plurality of contiguous tone blocks corresponds to a respective device set having at least one communication device and the number of spatial streams of a contiguous tone block is equal to a number of communication devices of the device set that corresponds to the contiguous tone block. The one or more integrated circuits are configured to determine an assigned contiguous tone block and spatial stream based on the block allocation and the spatial stream allocations. The one or more integrated circuits are configured to decode a data portion of a multi-user, multiple input multiple output (MU-MIMO) orthogonal frequency division multiple access (OFDMA) data unit using the assigned contiguous tone block and spatial stream.

In other embodiments, the apparatus includes any suitable combination of one or more of the following features.

The one or more integrated circuits are configured to decode the non-legacy signal field of the OFDM data unit comprises decoding a first field of the non-legacy signal field that includes a plurality of subfields having respective indices to a plurality of hierarchical codebooks. The plurality of hierarchical codebooks indicate predetermined block allocations and predetermined spatial stream allocations; and the block allocation and the spatial stream allocations are selected from the plurality of hierarchical codebooks.

The plurality of subfields includes a first subfield and one or more second subfields; the plurality of hierarchical codebooks includes i) a block allocation codebook that indicates the predetermined block allocations, ii) a multi-user codebook that indicates the predetermined spatial stream allocations, and iii) an index codebook that indicates which of the plurality of hierarchical codebooks are indexed by the one or more second subfields; and the first subfield has an index to the index codebook.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
selecting a block allocation that indicates a plurality of contiguous tone blocks of a wireless local area network (WLAN) communication channel for a multi-user, multiple input multiple output (MU-MIMO) orthogonal frequency division multiple access (OFDMA) data unit, wherein each of the plurality of contiguous tone blocks corresponds to a respective device set having at least one communication device;
selecting, for at least some of the plurality of contiguous tone blocks, respective spatial stream allocations that indicate a number of spatial streams for the corresponding contiguous tone block of the MU-MIMO OFDMA data unit, wherein the number of spatial streams of a contiguous tone block is equal to a number of communication devices of the device set that corresponds to the contiguous tone block;
encoding a first field to indicate the selected block allocation and the selected spatial stream allocations, wherein the first field includes a plurality of subfields having respective indices to a plurality of hierarchical codebooks that indicate predetermined block allocations and predetermined spatial stream allocations, wherein:
the plurality of subfields includes a first subfield and one or more second subfields,
the plurality of hierarchical codebooks includes i) a block allocation codebook that indicates the predetermined block allocations, ii) a multi-user codebook that indicates the predetermined spatial stream allocations, and iii) an index codebook that indicates which of the plurality of hierarchical codebooks are indexed by the one or more second subfields,
the selected block allocation and the selected spatial stream allocations are selected from the plurality of hierarchical codebooks, and
the first subfield has an index to the index codebook;
encoding one or more second fields to indicate a respective device identifier for each communication device of the respective device sets; and
transmitting the first field and the one or more second fields to the communication devices of the respective device sets.

2. The method of claim 1, wherein the plurality of hierarchical codebooks include a wide codebook that indicates the predetermined block allocations for a WLAN communication channel that is larger than a smallest channel bandwidth of a legacy WLAN communication protocol.

3. The method of claim 1, wherein a subfield of the one or more second subfields indicates at least one of i) the selected block allocation and the number of the plurality of contiguous blocks, and ii) the selected spatial stream allocations.

4. The method of claim 1, wherein selecting the respective spatial stream allocations comprises selecting the at least some of the plurality of contiguous tone blocks from the plurality of contiguous tone blocks having at least a threshold number of contiguous tones.

5. The method of claim 1, wherein a total number of communication devices of the respective device sets is larger than i) the number of the plurality of contiguous tone blocks, and ii) a maximum of the number of spatial streams for the at least some of the plurality of contiguous tone blocks.

6. The method of claim 1, wherein the method further comprises:
generating the MU-MIMO OFDMA data unit based on the selected block allocation and the selected spatial stream allocations; and
transmitting the MU-MIMO OFDMA data unit to the communication devices of the respective device sets.

7. A first communication device, comprising:
a network interface device having one or more integrated circuits configured to:
select a block allocation that indicates a plurality of contiguous tone blocks of a wireless local area network (WLAN) communication channel for a multi-user, multiple input multiple output (MU-MIMO) orthogonal frequency division multiple access (OFDMA) data unit, wherein each of the plurality of contiguous tone blocks corresponds to a respective device set having at least one second communication device;
select, for at least some of the plurality of contiguous tone blocks, respective spatial stream allocations that indicate a number of spatial streams for the corresponding contiguous tone block of the MU-MIMO OFDMA data unit, wherein the number of spatial streams of a contiguous tone block is equal to number of communication devices of the device set that corresponds to the contiguous tone block;
encode a first field to indicate the selected block allocation and the selected spatial stream allocations, wherein
the first field includes a plurality of subfields having respective indices to a plurality of hierarchical codebooks that indicate predetermined block allocations and predetermined spatial stream allocations,
the plurality of subfields includes a first subfield and one or more second subfields,
the plurality of hierarchical codebooks includes i) a block allocation codebook that indicates the predetermined block allocations, ii) a multi-user codebook that indicates the predetermined spatial stream allocations, and iii) an index codebook that indicates which of the plurality of hierarchical codebooks are indexed by the one or more second subfields,
the selected block allocation and the selected spatial stream allocations are selected from the plurality of hierarchical codebooks, and
the first subfield has an index to the index codebook;
encode one or more second fields to indicate a respective device identifier for each communication device of the respective device sets; and
transmit the first field and the one or more second fields to the communication devices of the respective device sets.

8. The first communication device of claim 7, wherein the plurality of hierarchical codebooks include a wide codebook that indicates the predetermined block allocations for a WLAN communication channel that is larger than a smallest channel bandwidth of a legacy WLAN communication protocol.

9. The first communication device of claim 7, wherein a subfield of the one or more second subfields indicates at least one of i) the selected block allocation and the number of the plurality of contiguous blocks, and ii) the selected spatial stream allocations.

10. The first communication device of claim 7, wherein the one or more integrated circuits are configured to select the at least some of the plurality of contiguous tone blocks from the plurality of contiguous tone blocks having at least a threshold number of contiguous tones.

11. The first communication device of claim 7, wherein a total number of communication devices of the respective device sets is larger than i) the number of the plurality of contiguous tone blocks, and ii) a maximum of the number of spatial streams for the at least some of the plurality of contiguous tone blocks.

12. The first communication device of claim 7, wherein the one or more integrated circuits are configured to:
generate the MU-MIMO OFDMA data unit based on the selected block allocation and the selected spatial stream allocations; and
transmit the MU-MIMO OFDMA data unit to the communication devices of the respective device sets.

13. A method, comprising:
receiving an orthogonal frequency division multiple orthogonal frequency division multiplex (OFDM) data unit via a wireless local area network (WLAN) communication channel;
decoding a non-legacy signal field of the OFDM data unit of the OFDM data unit to determine i) a block allocation that indicates a plurality of contiguous tone blocks of the WLAN communication channel, and ii) respective spatial stream allocations that indicate a number of spatial streams for at least some of the plurality of contiguous tone blocks, wherein each of the plurality of contiguous tone blocks corresponds to a respective device set having at least one communication device, and the number of spatial streams of a contiguous tone block is equal to a number of communication devices of the device set that corresponds to the contiguous tone block, and wherein:
the non-legacy signal field includes a plurality of subfields having respective indices to a plurality of hierarchical codebooks,
the plurality of subfields includes a first subfield and one or more second subfields,
the plurality of hierarchical codebooks includes i) a block allocation codebook that indicates predetermined block allocations, ii) a multi-user codebook that indicates predetermined spatial stream allocations, and iii) an index codebook that indicates which of the plurality of hierarchical codebooks are indexed by the one or more second subfields,
the block allocation and the spatial stream allocations are selected from the plurality of hierarchical codebooks, and
the first subfield has an index to the index codebook;
determining an assigned contiguous tone block and spatial stream based on the block allocation and the spatial stream allocations; and
decoding a data portion of a multi-user, multiple input multiple output (MU-MIMO) orthogonal frequency division multiple access (OFDMA) data unit using the assigned contiguous tone block and spatial stream.

14. A first communication device, comprising:
a network interface device having one or more integrated circuits configured to:
- receive an orthogonal frequency division multiple orthogonal frequency division multiplex (OFDM) data unit via a wireless local area network (WLAN) communication channel;
- decode a non-legacy signal field of the OFDM data unit to determine i) a block allocation that indicates a plurality of contiguous tone blocks of the WLAN communication channel, and ii) respective spatial stream allocations that indicate a number of spatial streams for at least some of the plurality of contiguous tone blocks, wherein each of the plurality of contiguous tone blocks corresponds to a respective device set having at least one communication device, and the number of spatial streams of a contiguous tone block is equal to a number of communication devices of the device set that corresponds to the contiguous tone block, and wherein:
  - the non-legacy signal field includes a plurality of subfields having respective indices to a plurality of hierarchical codebooks,
  - the plurality of subfields includes a first subfield and one or more second subfields,
  - the plurality of hierarchical codebooks includes i) a block allocation codebook that indicates predetermined block allocations, ii) a multi-user codebook that indicates predetermined spatial stream allocations, and iii) an index codebook that indicates which of the plurality of hierarchical codebooks are indexed by the one or more second subfields,
  - the block allocation and the spatial stream allocations are selected from the plurality of hierarchical codebooks, and
  - the first subfield has an index to the index codebook;
- determine an assigned contiguous tone block and spatial stream based on the block allocation and the spatial stream allocations; and
- decode a data portion of a multi-user, multiple input multiple output (MU-MIMO) orthogonal frequency division multiple access (OFDMA) data unit using the assigned contiguous tone block and spatial stream.

* * * * *